United States Patent
Strain et al.

(10) Patent No.: US 10,732,614 B1
(45) Date of Patent: *Aug. 4, 2020

(54) PROCESS DESIGN AND MANAGEMENT SYSTEM

(71) Applicants: Cathal J. Strain, Fairfield, CT (US); Adam Lalonde, Quaker Hill, CT (US); Richard W. Kimball, Colchester, CT (US); Majdi Rajab, Houston, TX (US)

(72) Inventors: Cathal J. Strain, Fairfield, CT (US); Adam Lalonde, Quaker Hill, CT (US); Richard W. Kimball, Colchester, CT (US); Majdi Rajab, Houston, TX (US)

(73) Assignee: Neo PLM, Inc., New Haven, CT (US)

( * ) Notice: Subject to any disclaimer, the term of this patent is extended or adjusted under 35 U.S.C. 154(b) by 13 days.

This patent is subject to a terminal disclaimer.

(21) Appl. No.: 16/144,438

(22) Filed: Sep. 27, 2018

Related U.S. Application Data

(63) Continuation of application No. 14/883,319, filed on Oct. 14, 2015, now Pat. No. 10,088,837.

(60) Provisional application No. 62/063,625, filed on Oct. 14, 2014.

(51) Int. Cl.
*G05B 19/418* (2006.01)

(52) U.S. Cl.
CPC .......... *G05B 19/41865* (2013.01); *G05B 2219/35204* (2013.01)

(58) Field of Classification Search
CPC .................. G05B 19/056; G05B 19/41865
See application file for complete search history.

(56) References Cited

U.S. PATENT DOCUMENTS

| | | | |
|---|---|---|---|
| 6,041,263 A | 3/2000 | Boston et al. | |
| 7,392,107 B2 | 6/2008 | Popp | |
| 8,606,379 B2 | 12/2013 | Marruchella et al. | |
| 8,738,190 B2 | 5/2014 | Pai et al. | |
| 9,008,815 B2 | 4/2015 | Popp | |
| 2002/0052862 A1* | 5/2002 | Scott | G06Q 10/06 |
| 2003/0017464 A1* | 1/2003 | Pohl | B01J 19/0046 506/39 |
| 2007/0050070 A1* | 3/2007 | Strain | G06Q 10/06 700/99 |
| 2007/0192715 A1* | 8/2007 | Kataria | G06Q 10/06 715/764 |
| 2008/0097623 A1 | 4/2008 | Weatherhead et al. | |
| 2010/0088075 A1 | 4/2010 | Yin et al. | |
| 2012/0095585 A1* | 4/2012 | Agarwal | G06Q 10/06 700/109 |
| 2013/0144591 A1 | 6/2013 | Khan | |

\* cited by examiner

*Primary Examiner* — Tuan C Dao
(74) *Attorney, Agent, or Firm* — St Onge Steward Johnston & Reens LLC

(57) ABSTRACT

A process design and management system for batch manufacturing of pharmaceuticals products. The system permits a user to create a chemical process design based on the user's input data and retrieved process library data which includes material data, process data, and equipment data. The system includes software objects defining operations sequences, and processing operation parameters including materials flows and balances, cycle time, constraints, equipment, generic equipment capability requirements, specific equipment capability requirements, and actual capacity analysis. A graphical user interface allowing multiple views of the chemical process design, including one or more of a design view, process flow view, time cycle view, and instructions view.

31 Claims, 21 Drawing Sheets

PROCESS DESIGN AND MANAGEMENT SYSTEM

FIELD OF THE INVENTION

The present application relates to systems for process design and management in the manufacturing of chemical products, particularly chemical and biologic pharmaceutical products, as well as food products and cosmetic products, with particular application for batch manufacturing processes of such products.

BACKGROUND OF THE INVENTION

The process of bringing a pharmaceutical to market can take years, and require a substantial capital investment. The required research and clinical trials are lengthy and time-consuming, but the regulatory approval is only the start of what is a complex process to produce and deliver product on a commercial scale. Once the U.S. Food and Drug Administration ("FDA") approves a drug, pharmaceutical engineers, chemists, and plant managers then prepare the pharmaceutical for mass production.

In pharmaceutical production, the key product to be produced is what is known as the active pharmaceutical ingredient ("API"). Typically, during premarketing development and clinical trials the API has only been produced in very small quantities on a lab bench scale. In a typical pharmaceutical production timeline in the United States a new product application (NDA) is submitted to the FDA (or equivalent regulatory authority in other countries or regions) together with a production process with basic parameters usually developed in the research lab. The process is then further developed for improvement in terms of yield, purity, economics, raw product availability; etc. Subsequently the bench scale "recipe" for the API, which often exists only on paper, must be scaled up to a manufacturing plant scale recipe to accommodate commercial production. The process design for commercial production of a new API can take many months. Once the manufacturing plant scale recipe is developed, the manufacturing process design is developed and tested. Operating instructions are prepared and a recipe is formulated for a production execution system which may comprise a DCS (distributed control system), or an Electronic Work Instruction, or other processor, or any combination of these computer based execution systems. A solvent or water run or dry run (if required), or other offline production simulation run is then effected to fine tune the system before the production campaign (which defines a sequence of one or more batches) is run. Batches of product (active pharmaceutical product or API) are released, with notation of deviations, changes and review. A constant monitoring and analysis of all the manufacturing information is maintained. Deviations from the predicted process design and from quality standards are recorded and investigated both for internal reasons and FDA compliance reasons. Problems with the process design are often uncovered when commercial production challenges emerge over time, and the process may need to be revised and/or the recipe may need to be reformulated until a consistent API product is delivered. All these steps can consume substantial time and expense and must be documented.

Process control systems that produce batches of products typically include a graphical interface, which enables a user (e.g., an engineer) to define and store one or more basic product recipes, batch parameters, equipment lists, etc. These basic product recipes typically include a sequence of process steps that are each associated with or bound to a particular equipment list. In binding recipe process steps to particular pieces of equipment, the user (e.g., an operator) explicitly defines, prior to the batch execution of the recipe, which piece of process control equipment to be used to carry out each process step of the recipe. Additionally, each of the process steps may require a user (e.g., an operator) to define one or more input/output (I/O) batch parameter values that are used during the execution of a batch to control the sequence and/or timing of equipment operations, set alarm limits, set target control values (e.g., set-points), etc. These I/O parameter values may be associated with inputs and outputs that are sent to or which are received from one or more of the field devices within the process control system or, alternatively, may be intermediate or calculated values that are generated by the process control system during the execution of a batch. Thus, in defining a batch, a user (e.g., an operator) typically uses the graphical interface to select a basic product recipe (which includes specifications that bind the process steps of the recipe to process control equipment) and to specify the parameter values that are to be used during execution of the batch.

Once a batch product recipe is perfected, it is exclusive to one plant. Historical differences in product lines at different facilities, combined with years of corporate mergers, spinoffs, and reorganizations, mean that even a single company has manufacturing plants each with a unique collection of equipment and systems, such that a recipe that works in one plant cannot easily be transferred to another plant, due to equipment differences, without substantial re-engineering of the recipe. Although systems have been proposed to automate the commercial scale recipe and process design, they have not delivered a fully enabled, operative system, and thus many of the above steps are typically manually determined and are not automated.

Additionally, manufacturing efficiency programs lead to ever more complex problems of process control and synchronization. Many modern batch process plants run several parallel batches using multiple sets of equipment, or sets of operatively connected control equipment units. Recipes have become more complex, increasing the number of procedural steps. Better real-time measurements of process parameters detect abnormal conditions such as, excess temperature, insufficient pressure, or an unexpectedly high concentration of a particular chemical. Systems desirably respond to these conditions as quickly as possible in order to reduce product loss and to avoid harmful situations.

In addition, government regulation of pharmaceutical batch manufacturing continues to become more exacting. The Food and Drug Administration of the United States (FDA) in 2003 launched the so-called Process Analytic Technology (PAT) initiative. The stated goal of PAT is to control the manufacturing process in addition to final manufactured products. To comply with PAT requirements, manufacturers must be able to assure quality at the intermediate steps of a corresponding manufacturing process and properly and timely respond to detected out-of-specification conditions.

Accordingly, there is a need for a fully integrated process design and management system for process manufacturing which is robustly adapted to operate at both a generic master recipe level and at a specific facility and equipment level.

SUMMARY OF THE INVENTION

A process design and management system comprising: a General Design digital software object allowing a user to assemble a process design based on the user's input data and retrieved process library data, the General Design software object defining operations sequences, and processing operation parameters including materials balances, cycle time, and constraints; the process library data being digital data, the process library data including material data, process data, and equipment data; a General Master Design digital software object allowing a user to derive a generic equipment process, the General Master Design software object defining operations equipment sequences, and processing operation parameters including equipment, generic equipment capability requirements, materials balances, cycle time, and constraints; and a Master Design digital software object allowing a user to derive a plant-specific equipment process, the Master Design software object defining operations equipment sequences, and processing operation parameters including specific equipment, specific equipment capability requirements, actual capacity analysis, materials flows and balances, cycle time, and constraints. Preferably, the system further includes a shop floor execution system processing object for creating a Master Recipe associated with the plant-specific equipment process. The system according to the present teachings provides a library of design objects that can be used to easily design a manufacturing plan through the user interface.

The graphical user interface allows multiple views of the process design, generic equipment process, and plant-specific equipment process. The graphical user interface views include one or more of a design view, process flow view, time cycle view, and instructions view. The design view identifies each equipment unit and lists the sequential process operations within each equipment unit; the process flow view displays inter-equipment connections and material transfers for the process; and the time cycle view displays start time, end time, slack time and duration for each operation of the process in order. The instructions view displays detailed manufacturing work instructions which include the key targets, ranges and textual description of the process. The design view, process flow view, instruction view and time cycle view dynamically interact with each other such that a change in one view will result in a corresponding change in the others.

One embodiment of a method for using the system to design a process includes the steps, but is not limited to: preparing a General Design using the user interface by selecting operations and constraints for the process, the operations and constraints defined in a system library; deriving a General Master Design from the General Design using the user interface, including adding equipment requirements and defining generic phases; deriving a Master Design from the General Master Design using the user interface, including defining specific equipment for a plant and mapping the generic phases to specific phases for the plant; and generating a Master Recipe from the Master Design for display through the user interface as instructions.

In one embodiment, the system allows users to simulate a design in order to validate the design model. This includes providing any validation errors encountered during the simulation to the user through the user interface.

In one embodiment, the system tracks each process step execution, equipment use, and material use, and lets the user manually or automatically adjust the process design for future batches. The batch manufacturing process and/or process recipe may have associated globally unique identifiers for each process ingredient and process step that permit the tracking of ingredients and the process steps of the process to enable a persisted correlated execution history. This way, multiple batch manufacturing process and/or process recipes may be correlated to determine process deviations in process equipment. Archived process data can be correlated across the product lifecycle, even where a Master Design has changed.

Other embodiments of the system and method are described in detail below and are also part of the present teachings.

For a better understanding of the present embodiments, together with other and further aspects thereof, reference is made to the accompanying drawings and detailed description.

DETAILED DESCRIPTION OF THE INVENTION

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments.

We refer to and incorporate by reference our U.S. Pat. Pub. No. 2007/0050070 as well as U.S. Provisional Patent Application Ser. No. 62/063,625 filed 14 Oct. 2014 in their entireties.

Figure 1A:
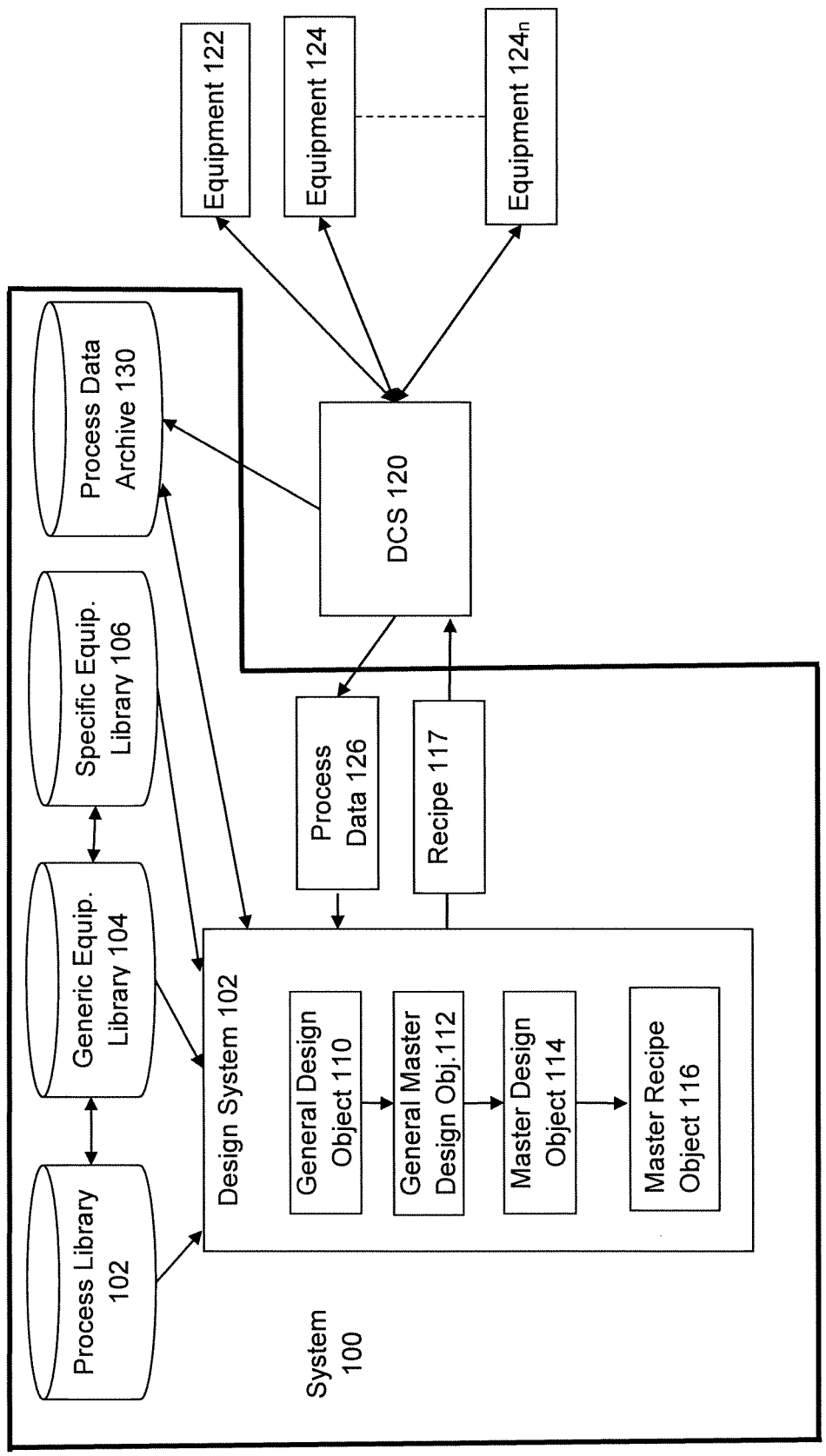
FIG. 1A is a diagram of one embodiment of a process design and management system in accordance with the present application.
Figure 1B:
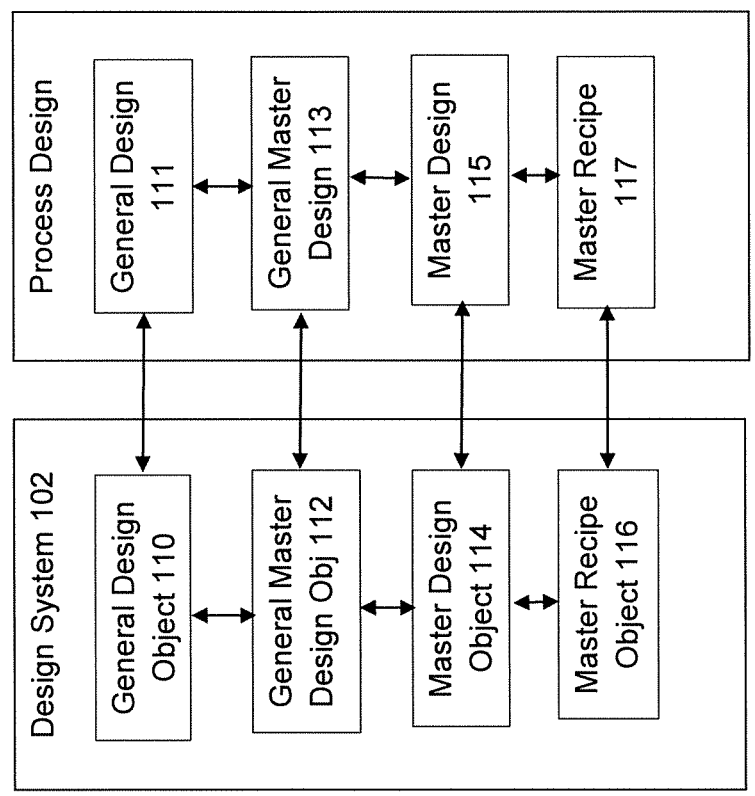
FIG. 1B is a diagram of the relations between software objects and data objects in one embodiment of a process design and management system in accordance with the present application.

Referring to FIG. 1A, a process design and management system 100 is shown; and FIG. 1B shows the relationship between the software objects of Design System 102 in process design and management system 100 and data objects created in Design System 102. Design System 102 which begins with a "General Design" object 110 that defines the process design, also referred to as the General Design 111. The General Design process definition is transformed to a generic equipment class based process sequence, which is referred to herein as the "General Master Design" 113 by General Master Design object 112. The General Master Design is used to create a "Master Design" 115 which is specific to a particular manufacturing plant and its equipment with equipment specific phases by Master Design object 114. Finally, a "Master Recipe" 117 which contains the manufacturing instructions which list all required inputs and steps, is created by the Master Recipe Object 116 of Design System 102 and used in automated and/or manual manufacturing execution systems such as DCS (Distributed Control System) 120. DCS 120 controls and monitors the process and manufacturing steps executed by Equipment 122, 124, through $124_n$. Instrumentation and measuring apparatus provided in Equipment 122, 124, $124_n$ provide process parameter measurement data 126 which is monitored by DCS 120 and continuously or periodically recorded in Process Data Archive 130. The process parameter measurement data 126 may optionally also be monitored by the system 100 in real time or through review of the Process Data Archive 130. Because the system may interact with plant manufacturing systems, it may receive real-time information concerning the status of plant equipment. This allows the system to both monitor multiple plants on a global scale, as well as to distribute the efficient manufacture of drugs to multiple plants, providing for true science based quality by design project planning on a global scale.

Process Library 102 supports the General Design object 110 with a library of predefined unit operations that can be used to populate General Design object 110. Generic Equipment Library 104 supports the General Master Design object 112 with a library of predefined equipment classes that can be used to operate the processes of General Design object 110. Specific Equipment Library 106 supports the Master Design object 114 with a list of available equipment at particular plant locations.

The General Design object 110 is intended to define the process sequence, material inputs and outputs and transfers, reactions and transformations, and constraints. This level of design may not be assigned to equipment or have detailed equipment-level activities defined. Preferably, it has equipment-independent process definitions. The General Design may be seen as the container for the level of information that would ordinarily be contained in a regulatory filing. It is not intended to be a design that would contain all the information necessary for transfer to manufacturing, but rather a container of the foundational process knowledge associated with chemical, physical, or biological transformations and the appropriate quality control constraints.

The General Design object 110 may incorporate concepts defined in S88 for 'General Recipes'. The most widely adapted standards for manufacturing control systems in the US and Europe are ISA S88.01 and IEC 61512-01 respectively (the disclosures of which are incorporated by reference). These standards refer to various models such as equipment models and recipe models and the various objects and components involved in manufacturing and batch control. Terminology and methodology used hereinafter are with respect to those defined in such standards and particularly in ISA S88.01 (S88).

General Design object 110 defines the essential process sequence, with associated process parameters, and with constraints (e.g., limits) where appropriate. In pharmaceutical manufacturing, constraints defined in the General Design object 110 may be regulatory constraints pertaining to product safety. Regulatory limits may be defined, classified and assigned to operations. For example, regulatory parameters and in-process controls may be defined and classified as critical quality attributes ("CQA") that impact the safety or efficacy of a product, critical process parameters ("CPP") that influence a CQA and that must be controlled within predefined limits to ensure the product meets its pre-defined limits, key process parameters ("KPP") that influence product quality or process effectiveness, and key quality attributes ("KQA") that have a potential to impact product quality or process effectiveness, among others. Other types of information may be compiled at this stage. For example, process definitions (e.g., operations) allow for a calculation of time cycle, instruction text, and material usage summary, among others.

Process Library 102 may be used to build the General Design 111. A user can also apply an "envelope" around several contiguous operations that may flow across several process units. This envelope may be referred to as a stage or operation group and used to support analysis and history correlation.

Once completed, the General Design 111 may be approved and locked such that it can only be modified by creating a new revision. Full electronic approval and audit trail may be maintained. Multiple General Designs 111 may be active, to take account of different sequencing options or differing requirements in different markets, for example.

The General Master Design 113 is an extension of the General Design 111 that enables the user to apply more equipment based information to a design. While the General Master Design 113 may not be site/equipment specific, it can add significant equipment-level operating details. Operations may be broken down into lower-level actions or steps. The lower level steps are referred to as Generic Phases. The General Master Design 113 may be populated with generic phases and generic equipment classes and capability selections from the Generic Equipment Library 104. Equipment classes/characteristics may be defined, generic phase detail added under each operation, and quality and action constraints defined. General Master Designs 113 can be used by any site and multiple versions may co-exist to address different equipment types (e.g., Nutsche filter vs. centrifuge, etc.) or different equipment train configurations.

Selecting equipment from a particular manufacturing plant transforms a General Master Design 113 to a Master Design 115. The equipment selection may involve a list of equipment with adequate capabilities for the process. A Master Design 115 may incorporate concepts defined by S88 for "Master Recipes."

At this level, specific details may be added that make the design specific to equipment in a specific manufacturing facility. Master Designs 115 are therefore site equipment dependent. The Master Design 115 may be developed using specific equipment and capability selections Specific Equipment Library 106. The Master Design object 114 allows the user to assign actual equipment and to map the generic phases to specific (local site) execution system objects like phases and equipment control modules. Site/equipment (or classes) may be selected, equipment operating details added, and process control constraints defined. Master Recipe 117 details and batch instructions may also be defined in the Master Design object 114 and/or Master Recipe object 116. Master Recipe 117 desirably is specifically written to integrate with a plant's existing manufacturing systems such as a distributed control system ("DCS"), laboratory information management system ("LIMS"), or manufacturing execution system ("MES"), providing a recipe specifically tailored for the plant.

The Master Recipe 117 is typically duplicated and used as the control recipe for each batch that is manufactured. Each control recipe will have additional data assigned or obtained during manufacturing, for example, batch ID, specific material lots consumed and produced, and which specific equipment was used for the batch.

Figure 2:
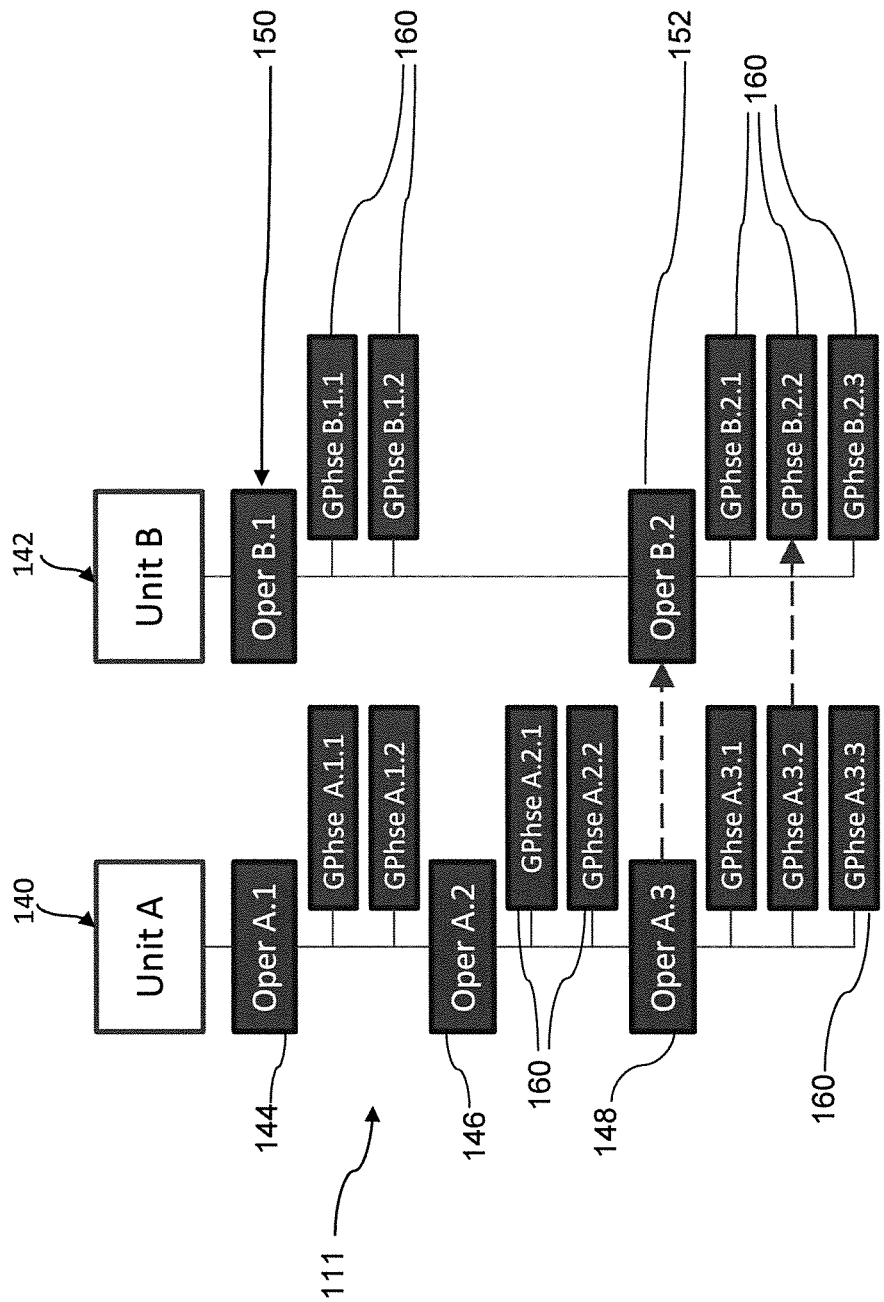
FIG. 2 is a diagram of a process hierarchical task assembly in a process design and management system in accordance with the present application.

General Design object 110 begins with a series of steps which constitute a General Design 111, which is a design hierarchical task assembly as illustrated in FIG. 2. The process design has one or more units (fundamental process equipment or work center) such as Unit A 140 and Unit B 142. Each unit has a sequence of operations such as 144, 146, 148, 150 and 152 that are created from operation definitions which collectively represent one simulated process stream. Operation definitions are reusable software objects selected from Process Library 102 that characterize physical, chemical, or biological process steps in the process stream. Operation definition software takes unit equipment classes, operation parameters, and synchronized operation parameters into account to create a sequence of subordinate generic phases 160 that are created from generic phase definitions. Generic phase definitions are reusable software objects that characterize physical, chemical, or biological process steps with associated generic equipment requirements specifically designed to be the building blocks in a General Master Design 113. Generic phases 160 inherit parameters and synchronizations from their parent operation and represent the next level of detail in the evolution of a process design.

Cycle time processing of generic phases 160 is controlled by the operation definition. Each generic phase 160 definition has a specific duration formula based on the physical, chemical, or biological transformation of the process step and the associated abstract equipment performance parameters. Duration formulas contain variables based on user input, facility, and equipment classes. The duration of each operation and generic phase in a process design is calculated. An operation can include time-based synchronization with one or more operations in other units (for example, material transfer between Oper A.3 148 & Oper B.2 152 shown in FIG. 2), and in the similar way, a generic phase can simulate time-based synchronization with one or more generic phases in other Units (e.g. GPhse A.3.2 & GPhse B.2.2).

Materials balance processing is determined by the General Design object 110. Material balances are determined based on the parent operation and the generic phase. Optionally the system permits a user to add one or more materials into the processing stream of a unit (e.g. Oper A.1 144) or transfer some or all of the mixture in a unit processing stream to another unit processing stream via a synchronized Operation (e.g. From Oper A.3 148 to Oper B.2 152). A mass balance simulation engine detects potential transformations and performs the appropriate changes to the mixture in the unit process streams. A design mass balance graph is automatically generated and maintained during process design construction using the generic phase processing stream and the transfer connections between them, including material additions, transfers, and transformations.

Figure 3:
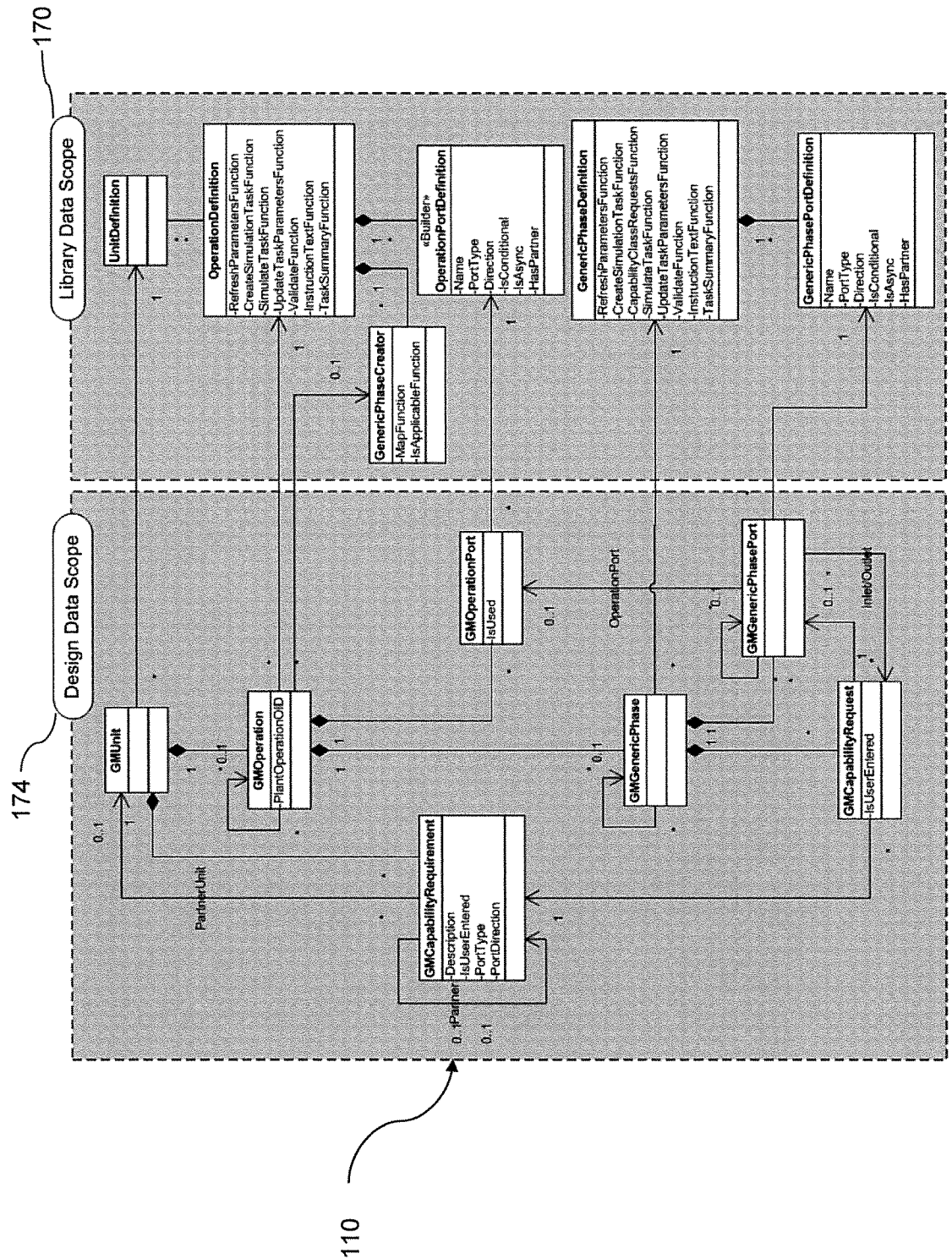
FIG. 3 is a UML class diagram showing the object oriented architecture of operations and generic phases in a process design and management system in accordance with the present application.

A UML (Unified Modeling Language) Class Diagram showing the architecture of General Design object 110 of system 100 and the major objects therein and their interaction in the development of a process design is illustrated in FIG. 3. In the FIGS, library data scope 170 objects contain objects that constitute design construction methods and rules and may be located in Process Library 102 and/or Generic Equipment Library 104. Reference data scope 172 objects are objects that define specific customer or plant location data and may be stored in Specific Equipment Library 106. Design data scope 174 objects are objects that store design knowledge. History data scope 176 objects are objects that store process data history and may be located in Process Data Archive 130.

Operations form the key building blocks that a user interacts with in General Design object 110, and to add more operational data in General Master Design object 112. When used in the General Design object 110, high level information is entered by the user, for a given operation, to define the process sequence. The user creates operation objects and connections between operation port objects manually, but design system 102 creates generic phase objects and connects generic phase port objects automatically by executing dynamic code that performs generic phase insertion and parameter mapping.

When the engineer reviews the same operation at the General Master Design object 112 level, additional information is required to be entered. Equipment capability requirements and other low level equipment activities that need to be performed in a manufacturing location are determined to define what the operation requires from a process perspective. Once all the detailed operation parameters are entered at the General Master Design object 112, design system 102 determines what generic phases 160 are needed for that Operation to be executed using a standardized best practice approach. Generic phases 160 define lower level equipment activities. System 100 maintains separate libraries of definitions for operations and generic phases 160. In many cases the same activity exists in both libraries with the generic phase level having more granular processing steps with additional details that impact design performance and quality. Both are non-plant specific or generic entities.

Material entities may facilitate mass balance and energy balance simulation and may include:
- ● Class entities that have parameter definitions for specific design relevant data such as atomic, physical, and thermal properties
- ● Definition entities that store specific materials and their properties (mixtures are stored as definition hierarchies)
- ● Specification entities that store variants of the same material that differ in ways that do not affect simulation results, but are critical to process understanding (e.g. grain size variants, impurity variants, etc.)

Product, product step, and process path entities may facilitate the effective management of the top level design information for global process step paths. In many process industries the number of processing steps is too large to practically manufacture in a single facility. A product step process can be modeled as a directed acyclic graph of process steps. Each process step can represent either reaction based transformations or material specification based transformations.

Equipment and resource class hierarchies may support design by providing parameter definitions for class specific properties. They may also provide a library of industry specific classes organized in logical hierarchies that include parameter definition inheritance from parent classes to child classes. The equipment classes may also provide the foundation for operation to generic phase mapping that can be driven by one or more equipment classes.

To facilitate equipment requirement simulation, dynamic equipment selection, and equipment switching during the design process, equipment detail may be modeled using capability and physical component entities. Both capability and physical component class hierarchies may support design by providing parameter definitions for class specific properties. They also may provide a library of industry specific classes that are organized in logical hierarchies that include parameter definition inheritance from parent classes to child classes. The capability class hierarchy may also have a function which provides the foundation for equipment requirement specialization where the higher level is less specialized and the lower level is more specialized (e.g. variable speed mixing vs. 2-speed mixing, liquid-inlet vs. water-inlet, etc.).

A facility may be used to store site specific knowledge such as local design preferences, language selection, and local costing data. The top level facility may be the global facility where all library data, global reference data (such as materials) and General Designs are stored. The second level in the hierarchy may represent site facilities that represent physical locations (such as a research or manufacturing campus) and may be used to store shared reference data (such as utility resources and mobile equipment). A third level in the hierarchy may represent lab or manufacturing locations (buildings or rooms) and may be used to store local reference data (such as equipment) and General Master and Master Designs. Users may have roles in multiple facilities, but their default preferences may be loaded from their home facility.

To accommodate facility specific equipment and process requirements, capability and resource specialization rules may be defined in each facility. The design application may use these rules to convert generic capability or resource requests into more specific capability or resource requests (e.g. liquid-inlet into water-inlet, receiver-tank into solvent-receiver-tank). Rule processing may be performed in the following sequence:
- ● Specialization is performed via the material consideration entities where the material transfer records are searched
- ● Injection is performed via the capability class resource class entities where a search is performed for the capability requests that require specific resource request
- ● Consolidation rules are performed to compute equipment capability requirements and resource requirements The user can also specialize the capability requests and resource request manually.

Material transfers may be consolidated and mapped to unit inlets, outlets, and logical inter-unit connection requirements. Generic phases may generate one or more equipment capability requests. Equipment capability requests may be consolidated into equipment capability requirements based on shareable capability rules and facility specific rules. Generic phases may generate one or more resource requests.

One skilled in the art would appreciate the different entities that may be used in accordance with the present teachings, which are not limited to any particular embodiment disclosed herein. In addition, entities may contain dynamic code which is defined as code that is injected into the application at runtime. The dynamic code capability may be used to allow for application extensibility without the need to change and revalidate the core system foundation, which is desirable in keeping the cost of change management low in a regulatory environment Referring again to the software architecture illustrated in FIG. 3, the Library Data Scope 170 contains Unit Definition ("UnitDefinition"), Operation Definition ("OperationDefinition"), Operations Port Definition ("OperationPortDefinition"), Generic Phase Definition ("GenericPhaseDefinitions") and Generic Phase Port Definition ("GenericPhasePortDefinition") objects. A Generic Phase Creator ("GenericPhaseCreator") functionality is available. The Design Data Scope 1130 contains a General Master Unit ("GMUnit") which is in turn composed of the General Master Operation ("GMOperation") and General Master Capability Requirement ("GMCapabilityRequirement") objects. The composition of the General Master Operation includes the General Master Operation Port ("GMOperation Port") and General Master Generic Phase ("GMGenericPhase") objects. The composition of the General Master Generic Phase includes the General Master Capability Request ("GMCapabilityRequest") and General Master Generic Phase Port (GMGenericPhasePort") objects. The General Master Operation is associated with the Operation Definition object, the General Master Operation Port is associated with the Operation Port Definition, the General Master Generic Phase is associated with the Generic Phase Definition, and the General Master Generic Phase Port is associated with the Generic Phase Port Definition.

The system 100 objects provide a framework for hierarchical task assembly, with the ability to (1) capture the science/chemistry of the process; (2) transform the process definition to a generic, equipment class based process sequence; (3) switch equipment classes in the process if desired; and (4) transfer the process from one manufacturing plant to another and generate a customized recipe appropriate for the target plant.

A significant consideration in the General Design object 110 is constraint processing. Constraints are regulatory or quality limitations, for example, "reactant y must never exceed 120° C." or "the concentration of solute z must be below 6,200 ppm in solution." In addition to process design level constraints such as the above, there may be equipment constraints, for example, in the Master Design 115 level, the plant facilities may have mixing vessel of limited size, and the proposed General Design 111 might be unworkable if the batch size would exceed the vessel capability. Constraint definitions are reusable software objects that define constraints and are used in validation of a simulated process stream. A user can select one or more constraints from a library of constraint definitions to add a unique constraint instance to the General Design 111. Each constraint instance must be mapped to one or more operations or generic phases based on the mapping rules imposed by the constraint definition. Constraints inherited from a General Design 111 cannot be removed by the user in lower level General Master 113 or Master Designs 115. During simulation cycles, constraint violations are reported to the user. Also, a user can optionally map a constraint to one or more operation parameters to define cause-effect relationships.

Figure 4:
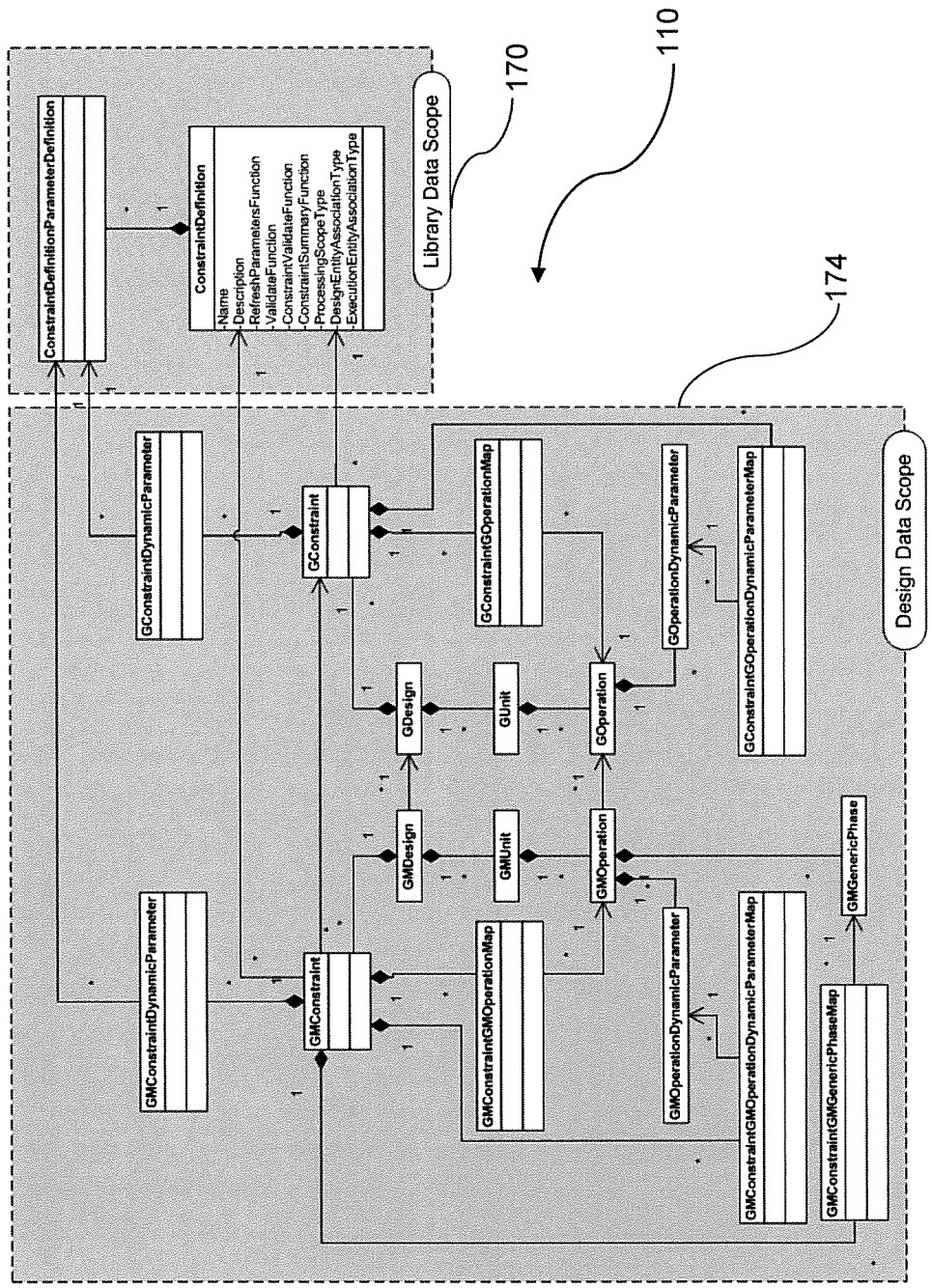
FIG. 4 is a UML class diagram showing the object oriented architecture of constraint processing in a process design and management system in accordance with the present application.

A UML Class Diagram showing the architecture of constraint processing in General Design object 110 of system 100 is illustrated in FIG. 4. The constraint framework is used to store design knowledge that define critical boundaries that are tracked to manage product quality. Constraints that are created in the General Design object 110 represent regulatory requirements or critical boundaries. They are copied to the General Master Design object 112 as locked objects. A user will typically create additional constraints at the General Master Design 113 level to add additional knowledge related to product quality, environmental, legal, or other reasons, and manually associate them with one or more operations and generic phases. Users can optionally add operation dynamic parameter associations to document important cause and effect relationships between an upstream operation and a downstream operation where quality sampling is required.

Referring to the constraint processing software architecture illustrated in FIG. 4, the Library Data Scope 170 contains Constraint Definition Parameter Definitions ("ConstraintDefinitionParameterDefinition") and Constraint Definitions ("ConstraintDefinition"). The Design Data Scope 174 shows the General Constraint ("GConstraint") as an object which is part of the General Design object 110 ("GDesign") and the General Master Constraint ("GMConstraint") which is part of the General Master Design object 112 ("GMDesign"). FIG. 4 illustrates the previously described General Unit ("GUnit") as an object in the General Design object 110, the General Operation ("GOperation") as an object in the General Unit, and the General Operation Dynamic Parameter ("GOperationDynamic Parameter") as an object in the General Operation. The composition of the General Constraint includes General Constraint General Operation Map ("GConstraintGOperationMap"); General Constraint General Operation Dynamic Parameter Map ("GConstraintGOperationDynamic ParameterMap"); and General Constraint Dynamic Parameter ("GConstraint Dynamic Parameter") objects. The General Constraint General Operation Dynamic Parameter Map is associated with the General Operation Dynamic Parameter; and the General Constraint General Operation Map is associated with the General Operation object. The General Constraint Dynamic Parameter is associated with the Constraint Definition Parameter Definition in Library Data Scope 170. FIG. 4 also illustrates the previously described General Master Unit ("GMUnit") as an object in the General Master Design object 112, the General Master Operation ("GMOperation") as an object in the General Master Unit, and the General Master Operation Dynamic Parameter ("GOperationDynamic Parameter"), the General Master Generic Phase ("GMGenericPhase") as objects in the General Master Operation. The composition of the General Master Constraint includes General Master Constraint General Master Operation Map ("GMConstraintGMOperationMap"); General Master Constraint General Master Operation Dynamic Parameter Map ("GMConstraintGMOperationDynamic ParameterMap"); General Master Constraint General Master Generic Phase Map ("GMConstraintGMGenericPhaseMap") and General Master Constraint Dynamic Parameter ("GMConstraint Dynamic Parameter") objects. The General Master Constraint General Master Operation Dynamic Parameter Map is associated with the General Master Operation Dynamic Parameter; the General Master Constraint General Master Operation Map is associated with the General Master Operation; and the General Master Constraint General Master Generic Phase Map is associated with the General Master Generic Phase object. The General Master Constraint Dynamic Parameter is associated with the Constraint Definition Parameter Definition in Library Data Scope 170.

The constraint processing objects provide the system 100 with ability to automatically validate changes in the General Design against any and all constraints known to the System. Further, when system 100 is run in a simulation mode, it allows the user to identify and evaluate both direct and indirect cause and effect outcomes arising from process changes in the General Design.

Figure 5:
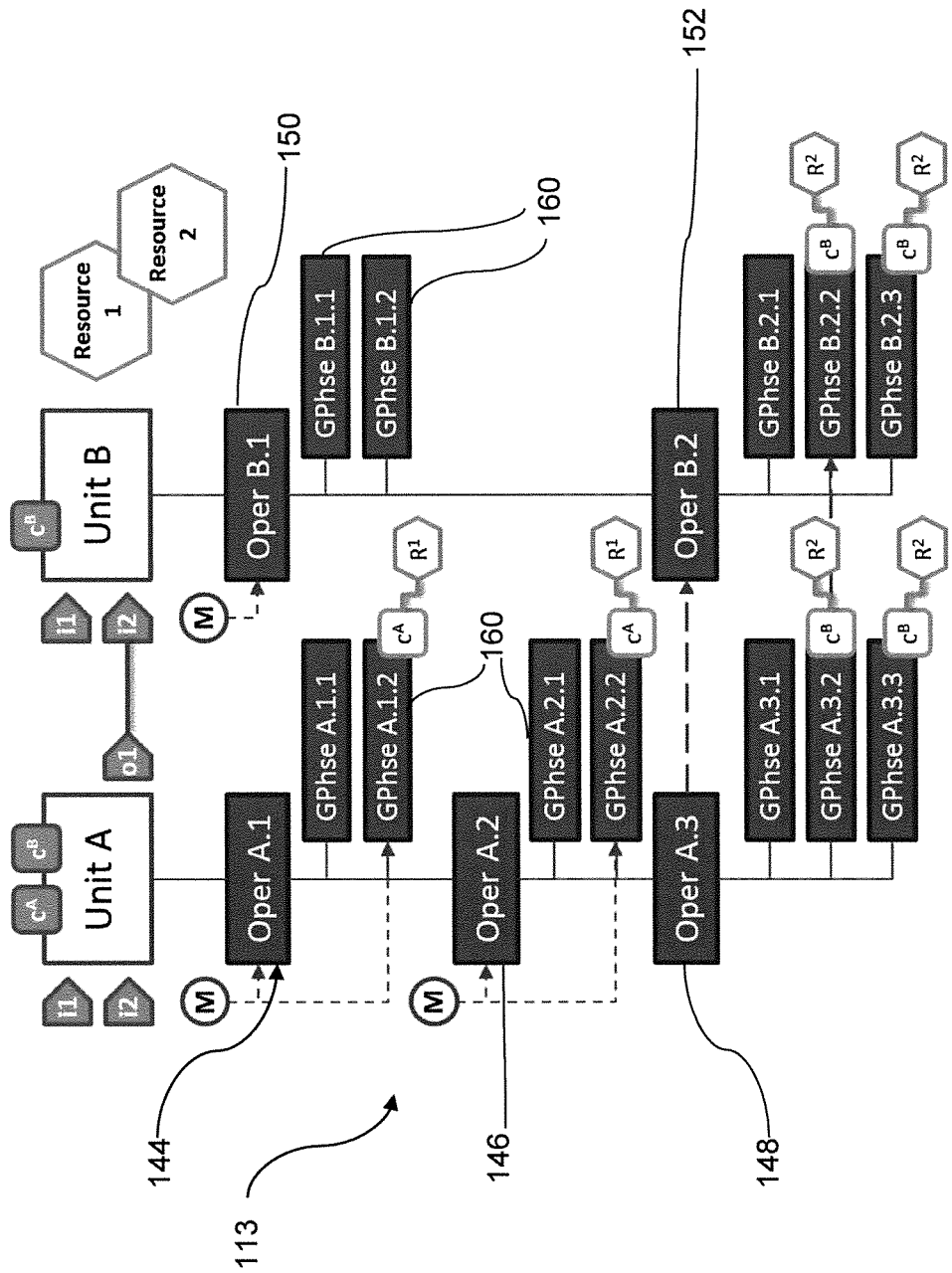
FIG. 5 is a diagram of equipment requirement processing task assembly in a process design and management system in accordance with the present application.
Figure 6:
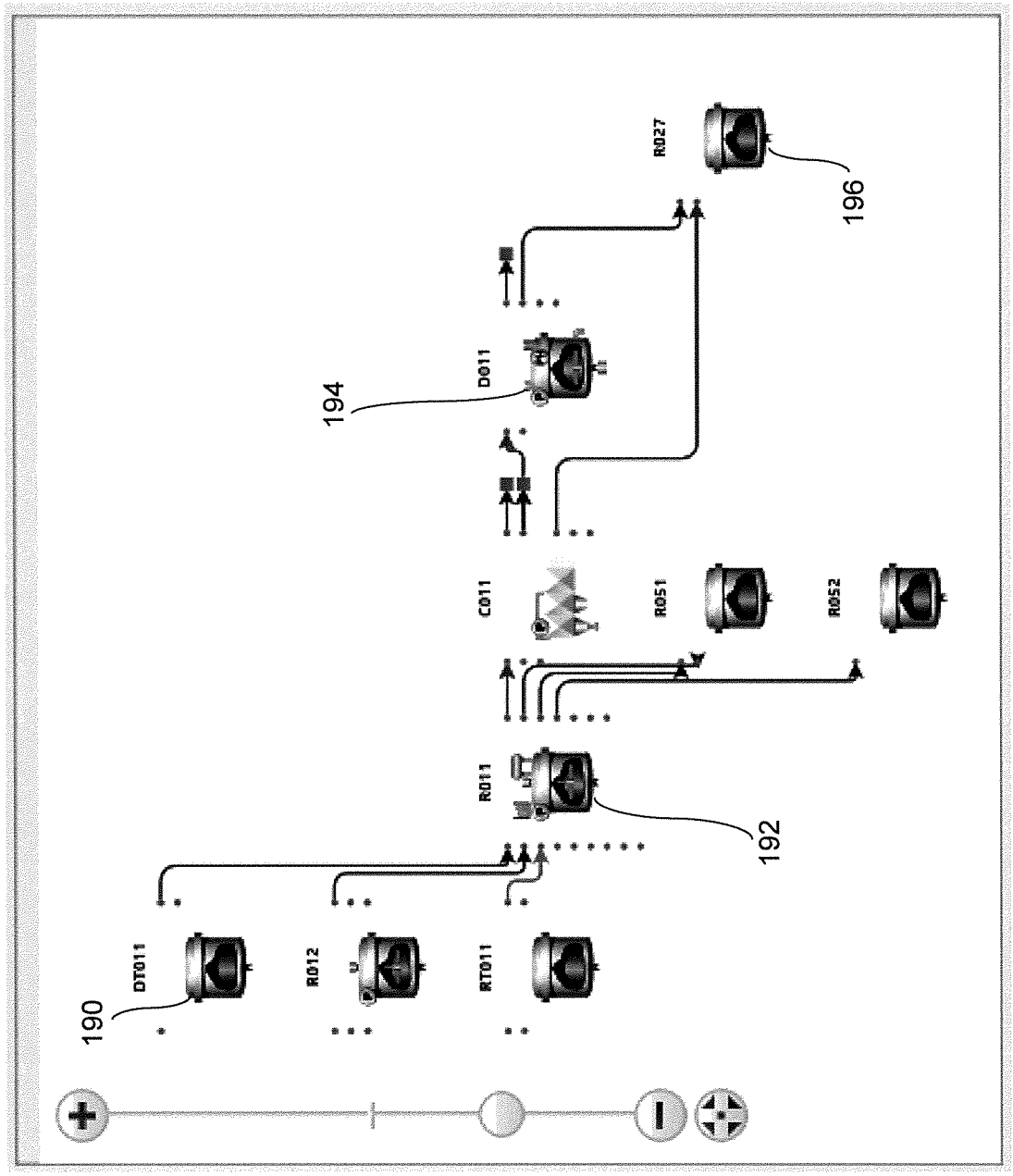
FIG. 6 is an illustration of a process flow layout in a process design and management system in accordance with the present application.

FIG. 5 illustrates the extension of a General Design 111 to a General Master Design 113. Equipment requirement processing determines required attributes of equipment needed to implement the General Design 111. Material (M) flows and transfers mapped to unit inlets (i1, i2) and unit outlets (o2), and inter-unit connection requirements are determined. The previously defined generic phases can generate one or more equipment capability requests ($c^A$, $c^B$) and associated resource requests ($R^1$, $R^2$) which define direct and indirect instrumentation, consumable, shared utility or labor needs. In this step the sequential or parallel nature of the different process actions are considered and where possible process requests are consolidated and/or equipment capability and resource requests are consolidated to minimize the total required equipment and resources. The equipment capability requests are finalized as General Master Design 113 equipment capability requirements. A process flow layout as shown in FIG. 6 is diagrammed based on the General Master Design 113. FIG. 6 shows a series of reactor vessels 190, 192, 194, 196 and other equipment and the component flow paths as arrows in the layout.

Figure 7:
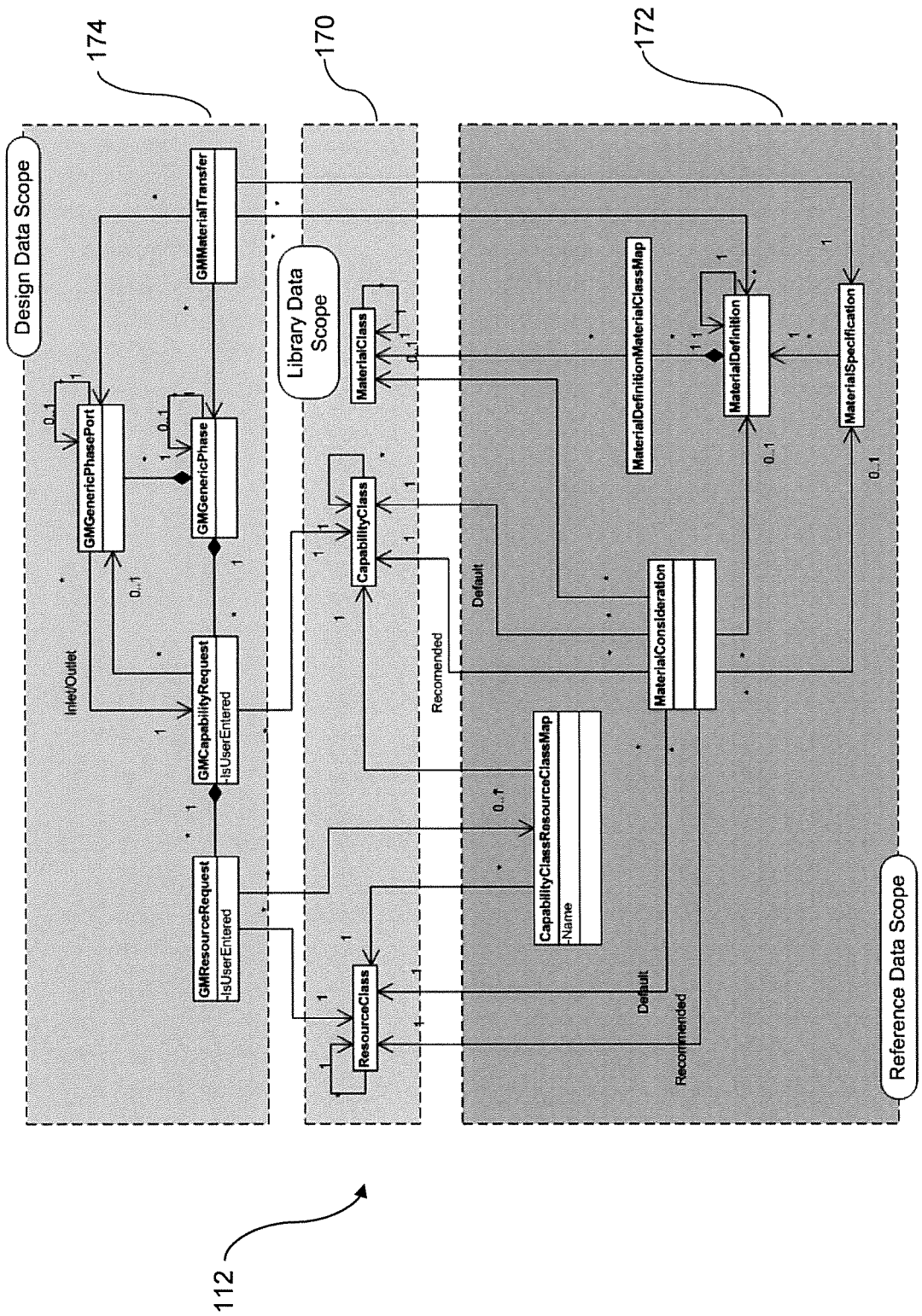
FIG. 7 is a UML class diagram showing the object oriented architecture of equipment requirement processing in a process design and management system in accordance with the present application.

A UML Class Diagram showing the architecture of equipment requirement processing in General Master Design object 112 in system 100 is illustrated in FIG. 7. In FIG. 7, the Library Data Scope 170 contains "ResourceClass", CapabilityClass" and "MaterialClass" objects. These objects in turn receive data from "CapabilityClassResourceClassMap", "MaterialConsideration", "Material Definition", and "Material DefinitionMaterialClassMap" objects in Reference Data Scope 172. A "MaterialSpecification" object in Reference Data Scope 172 informs the "MaterialDefinition" object. The Design Data Scope 174 shows the General Master Generic Phase ("GMGenericPhase") which determines generic phases using equipment data from the Library Data Scope 170 and Reference Data Scope 172. In particular, General Master Generic Phase includes General Master Phase Port ("GMPhasePort"), and General Master Capability Request ("GMCapabilityRequest") objects; and has an associated General Master Material Transfer ("GMMaterialTransfer"). The General Master Capability Request includes a General Master Resources Request ("GMResourceRequest") object. These objects interact with the "ResourceClass", "CapabilityClass" and "MaterialClass" objects to determine a General Master Design 113. Capability and resource specialization rules can be defined in each object. In such cases, system 100 uses these rules to convert generic capability or resource requests into more specific capability or resource requests (e.g. liquid-inlet into water-inlet, receiver-tank into solvent-receiver-tank).

The equipment requirement processing objects provide the system 100 with dynamic equipment selection and mapping, allowing the General Design 111 to be applied to any manufacturing plant or multiple manufacturing plants. Further, it provides an automatic definition of equipment train setup and connections.

The General Master Design 113 is implemented as a Master Design 115 through specific equipment selection processing. Equipment selection processing steps begin by identification of all equipment that could be used by a unit in a General Master Design 113. The units are provisionally selected for use in the General Master Design 113, and the actual capacity of the identified equipment is analyzed to determine if the equipment is capable of satisfying the General Master Design 113. The actual capacity algorithm includes analysis of pipe, inlet and vessel capabilities (e.g. for example, whether different material charging capabilities share the same physical inlet component). Equipment having the required capabilities is identified and a Master Design 115 is developed.

Figure 8:
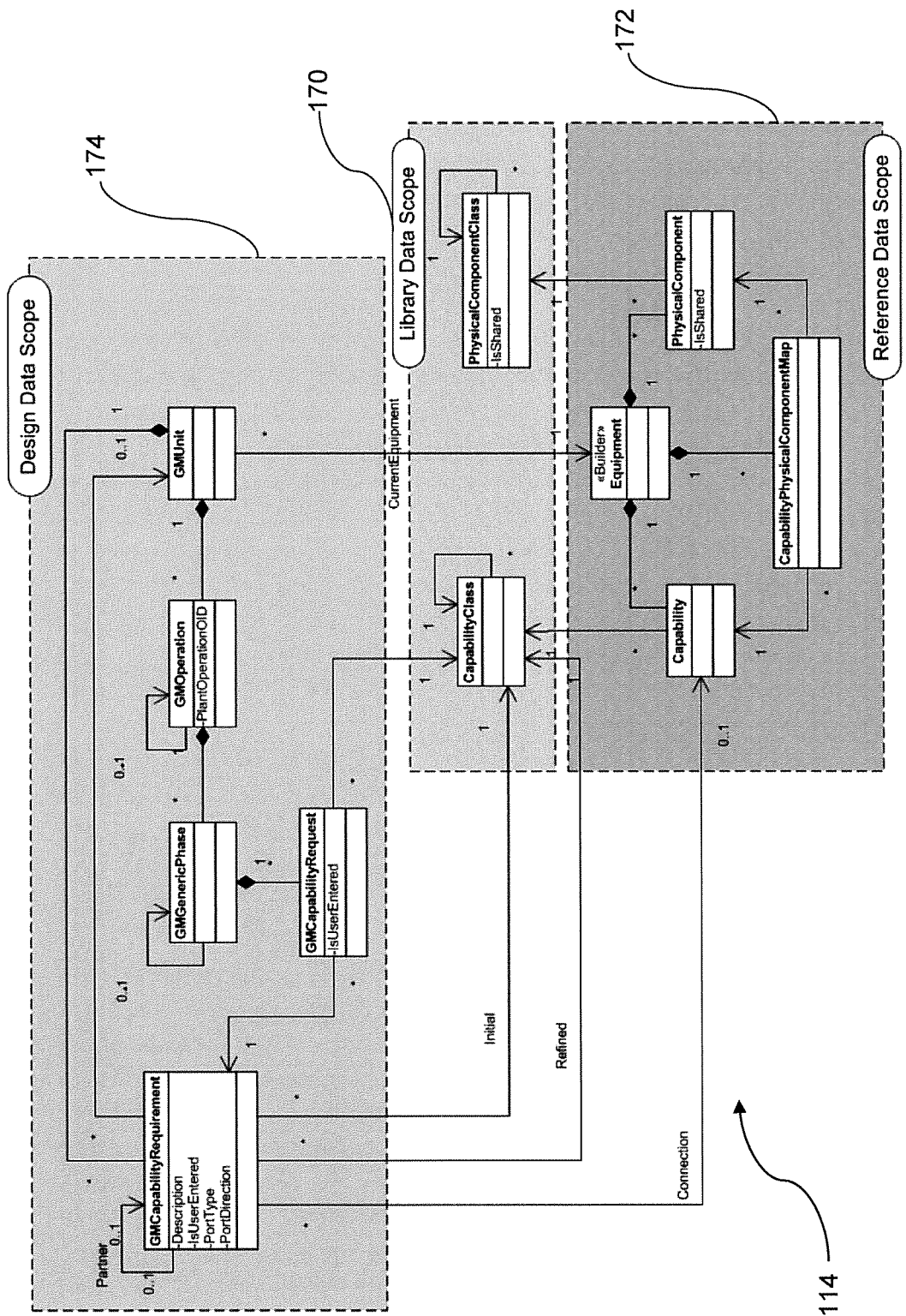
FIG. 8 is a UML class diagram showing the object oriented architecture of specific equipment selection processing in a process design and management system in accordance with the present application.

A UML Class Diagram showing the architecture of specific equipment selection processing in Master Design object 115 in system 100 is illustrated in FIG. 8. As seen therein, Design Data Scope 174 uses physical component data from the Library Data Scope 170 and Reference Data Scope 172. Library Data Scope 170 includes "CapabilityClass" and "PhysicalComponentClass" objects. Reference Data Scope 172 includes the "Equipment" object which includes "Capability," "PhysicalComponent", and "CapabilityPhysicalComponentMap" objects. The Design Data Scope 174 shows the previously described General Master Unit ("GMUnit"), General Master Operation ("GMOperation"), and General Master Generic Phase ("GMGenericPhase") objects and additionally shows the General Master Capability Requirement ("GMCapabilityRequirement") along with the previously described General Master Capability Request ("GMCapabilityRequest") objects. The General Master Capability Requirement interacts with the "CapabilityClass", and "Capability" objects and the General Master Unit interacts with the Equipment object to determine a Master Design 115.

The specific equipment selection processing objects provide the system 100 with the ability to map the General Design 111 to physical devices and instrumentation; and to conduct a detailed analysis and validation of equipment fit. To accommodate error free transfer of execution recipe information to a variety of execution systems (such as Paper Batch Books, Electronic Lab Notebooks, Distributed Control Systems, Manufacturing Execution Systems, etc.), facility specific Phase Definitions, Phase Maps, and Recipe Generators can be configured.

Figure 9:
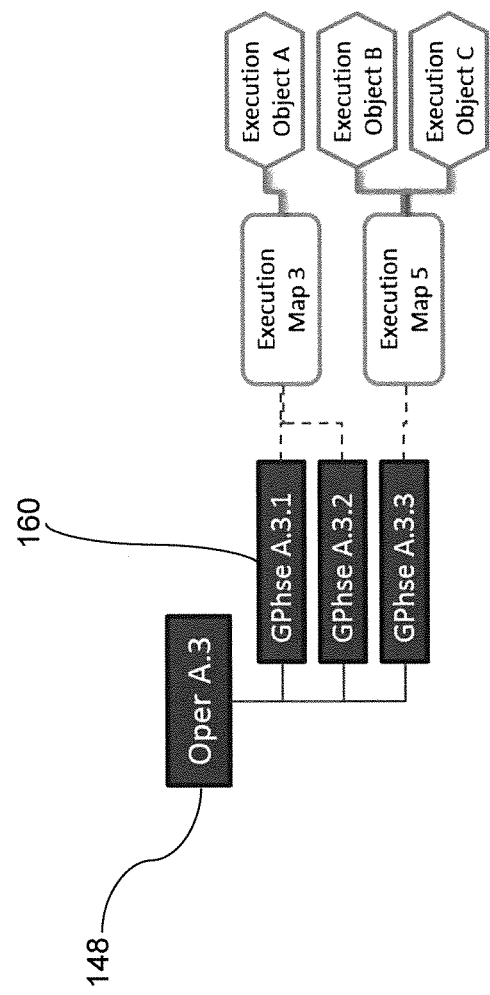
FIG. 9 is a diagram of an example shop floor execution system map in a process design and management system in accordance with the present application.

The Master Design 115 is the basis of Master Recipe 117, which is derived through shop floor execution system processing in Master Recipe object 116. Referring to FIG. 9, shop floor execution system processing uses execution definitions, which are reusable software objects that define execution objects and associated parameters that are specifically designed to be the building blocks for batch execution recipes. Phase definitions are reusable software objects that define the execution objects and associated parameters that are specifically designed to be the building blocks for batch execution recipes. Phase maps are searchable records that map one or more generic phases to one or more phase definitions. The system may find the highest priority phase maps and add the corresponding phase object instances to a Master Design. It may then invoke the dynamic code within each phase definition to generate default parameter values which are derived from associated generic phases. A user can optionally remove an applied phase map and the associated object instances and apply a different phase map. A plant-specific recipe generator may then create a recipe using the Master Design structure which includes phase objects and their parameters FIG. 9 shows the sequence of actions of operation 148 previously introduced in FIG. 2 and associated execution maps for each generic phase. Execution maps are searchable records that map one or more generic phases to one or more execution definitions. The system identifies the highest priority execution maps and adds the corresponding execution object instances to a process design. Dynamic code within each execution object is invoked to generate default parameter values which are derived from associated generic phases. The pluggable execution system Master Recipe 116 object is then invoked to create the Master Recipe 117 using the process design structure which includes execution objects and their parameters.

Figure 10:
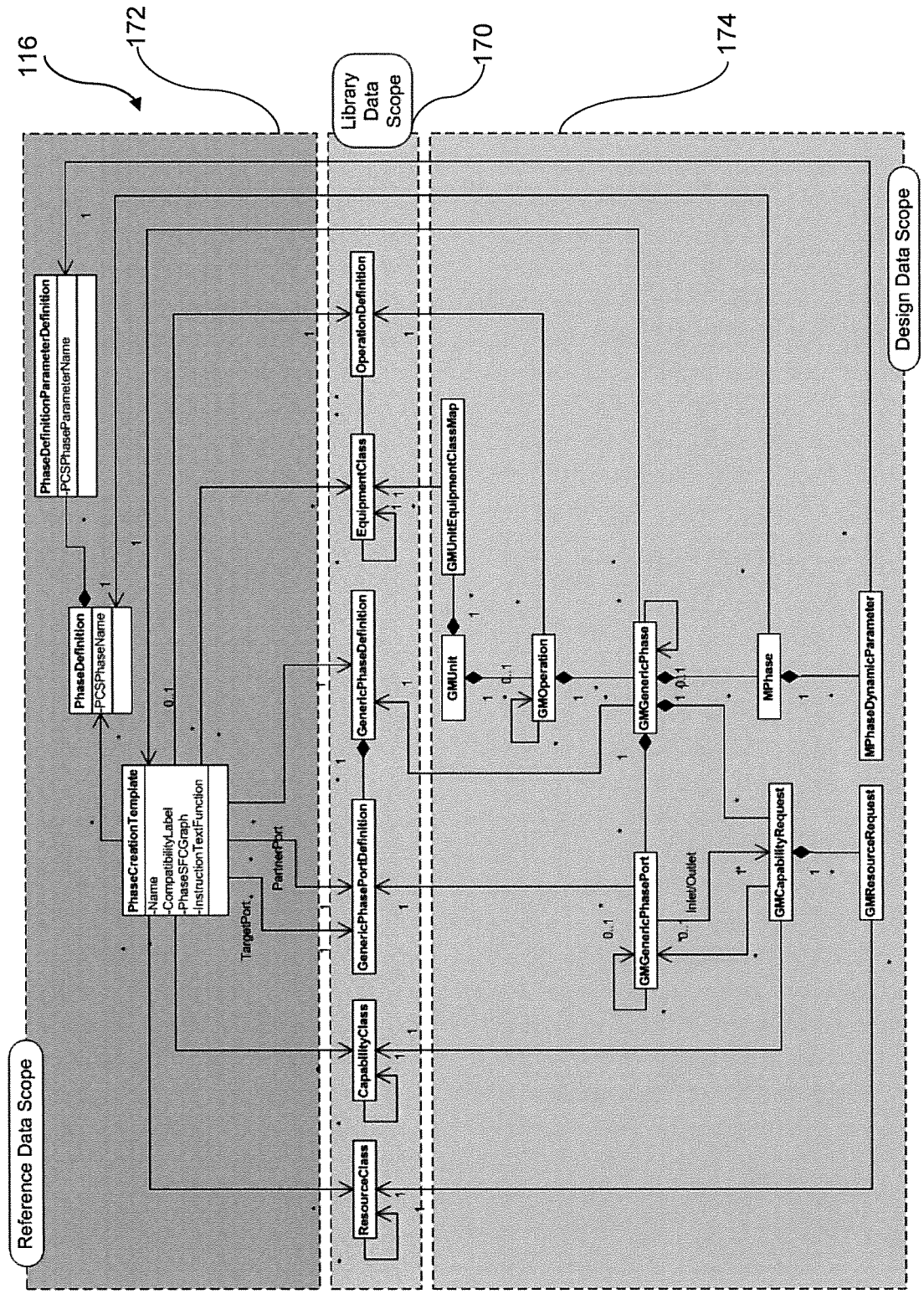
FIG. 10 is a UML class diagram showing the object oriented architecture of execution system phase mapping in a process design and management system in accordance with the present application.

A UML Class Diagram showing shop floor execution system processing in Master Recipe object 116 in system 100 is illustrated in FIG. 10. In FIG. 10, the Library Data Scope 132 in this view shows the "ResourceClass", "CapabilityClass", "GenericPhaseDefinition" and "GenericPhasePortDefinition", "EquipmentClass" and "OperationDefinition" objects. These objects in turn receive data from "PhaseCreationTemplate" object in Reference Data Scope 134. The Phase Creation Template interacts with the "PhaseDefinition" and through it, the "PhaseDefinitionParameterDefinition" object. The General Master Generic Phase object initiates the PhaseCreationTemplate object and the Master Recipe Phase ("Mphase") to create the Master Recipe 116 using the "PhaseDefinition", "MPhaseDynamicParameter" and "PhaseDefinitionParameterDefinition" objects.

The shop floor execution system objects permit the system 100 to provide a user with rapid mapping of the General Design to manufacturing execution and control systems at a particular plant; and also provide a feedback and quality control system by providing mapping of the execution history (discussed below) back to the Master Design and by reference through the design genealogy hierarchy back to the General Design, allowing continuous improvement of the process design.

Equipment instrumentation may be used to obtain process parameter measurements. The instrumentation process parameter measurement data is received by manufacturing execution systems, SCADA systems, and distributed control systems with batch execution objects to produce execution history records. Desirably, the execution history records include the Master Design GUIDs that were previously included within imported recipes. Process parameter measurement data 126 includes but is not limited to task execution event history, execution alarm history, operator action history, material transaction history, and sample test results. Raw history data may be aligned and extrapolated to compensate for time domain fluctuations.

Process parameter measurement data 126 which is recorded in Process Data Archive 130 is correlated to one or more of the General Design 111, the General Master Design 113, the Master Design 115, and the Recipe 117. In most instances correlation occurs at the Master Design 115 level. The correlation determines variances and anomalies, including but not limited to: unexpected equipment/resource utilization; out of sequence task execution; skipped execution tasks; unexpected duplicate execution tasks; unexpected execution tasks; parameter value discrepancies; constraint violations; unexpected delays between execution tasks; and unexpected execution task durations.

Figure 11:
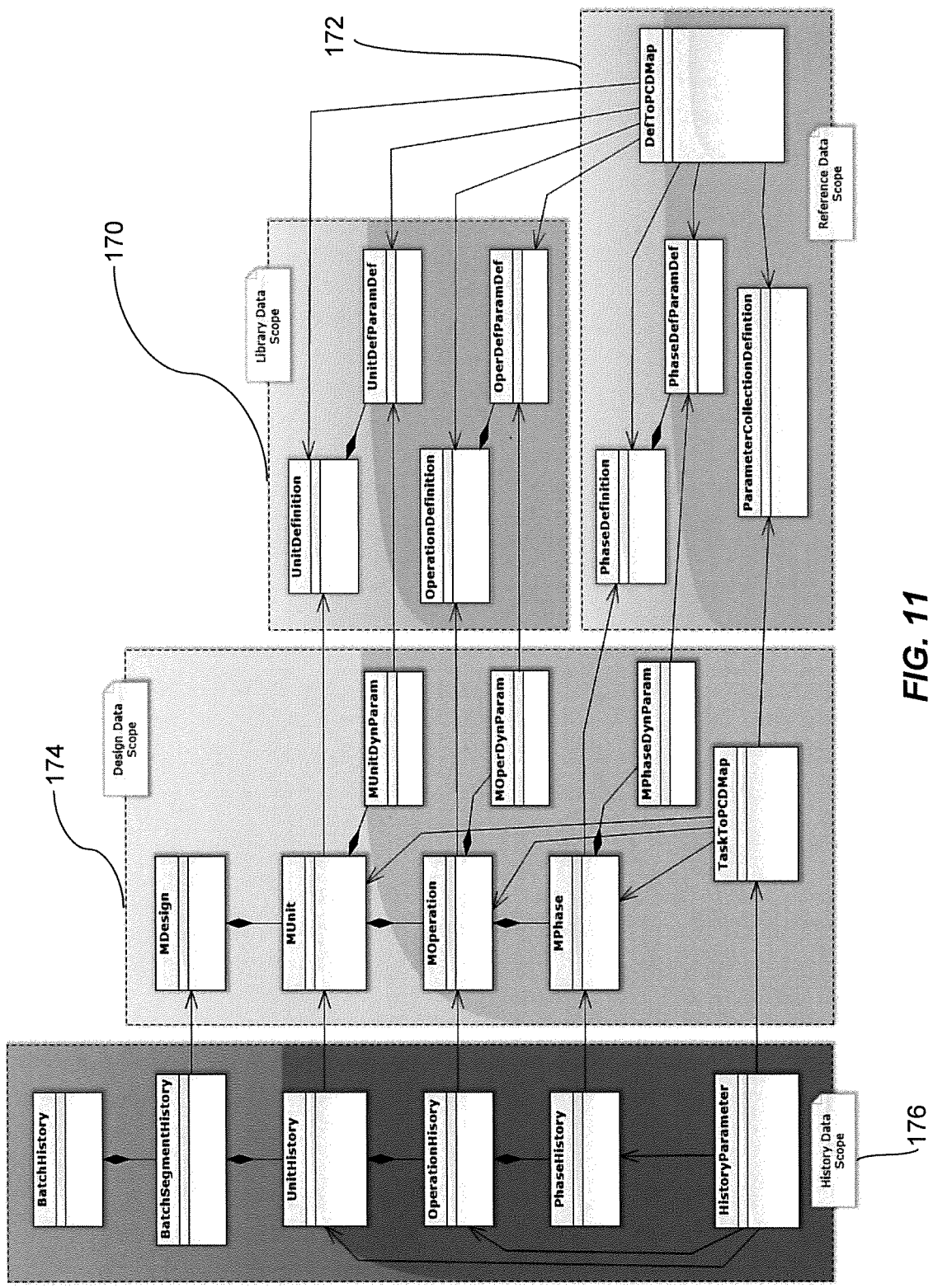
FIG. 11 is a UML class diagram showing the object oriented architecture of execution history correlation processing in a process design and management system in accordance with the present application.

A UML Class Diagram showing execution history correlation processing in system 100 is illustrated in FIG. 11. In FIG. 11, the History Data Scope 176 includes a "BatchHistory" object which contains BatchSegmentHistory", UnitHistory", "OperationHistory", and "PhaseHistory" objects, as well as a "HistoryParameter" object. A history of each measured parameter is recorded in these objects. The Library Data Scope 170 includes "UnitDefinition" and Unit Definition Parameter Definition ("UnitDefParamDef"); and "OperationDefinition" and Operation Definition Parameter Definition ("OperDefParamDef") objects. The Reference Data Scope 172 includes "PhaseDefinition" and Phase Definition Parameter Definition ("PhaseDefParamDef") objects, along with "ParameterCollectionDefinition" and a Definitions to Parameter Collection Definition Map ("DefToPCDMap"). The Design Data Scope 174 contains the Master Recipe Design ("MDesign"), which in turn contains the Master Recipe Unit ("MUnit") and Master Recipe Unit Dynamic Parameter ("MUnitDynParam"), Master Recipe Operation ("MOperation") and Master Recipe Operation Dynamic Parameter ("MOperationDynParam"), Master Recipe Phase ("MPhase") and Master Recipe Phase Dynamic Parameter ("MPhaseDynParam"), and a Task to Parameter Collection Definition Map ("TaskToPCDMap").

The execution history objects provide system 100 with the ability to validate the as-run batch process against the process design; to conduct a comprehensive quality review without the need for data cleansing; and to conduct accurate performance assessments. A persistent correlated execution history that contains links to process design objects provides an anomaly/exception analysis tool. The software interface can display all detected anomalies and correlation to the related process design structure. The user can then add review comments to explain anomaly impact on the batch; add missing execution history or correct existing execution history; and/or re-process the history correlation algorithm on the batch with the updated execution history.

The system provides the user with the ability to compare process execution on different batches. For example, each generic phase (or action), use of equipment, and use of material may be independently tracked, although not limited thereto. This allows the system to determine deviations that result in different batch results (for better or worse). This information may then be used to refine the process design by taking advantage of this historical data. For example, a deviation that results in an improvement may be added to the design. A deviation that results in a worsening in yield, for example, may indicate that an additional constraint should be added to the design to prevent the deviation in the future.

The execution history objects further provide the system 100 with version correlation analysis. Process designs may change from time to time due to equipment changes and optimization opportunities or when the design is transferred from one facility to another. Each process design is determined and recorded with a different identifier. For example, different versions of the General Design 111, the General Master Design 113, and the Master Design 115 are identified with a distinct identifier, for example, version IDs such as v1.0, 1.1, 1.2, etc. Accordingly, designs may have 'Version Shared IDs' that point to previous versions. A new version of a design can be created by copying or deriving from a higher level design. The Version Shared IDs can be used facilitate comparative analysis.

Since the execution history objects are each correlated to different process designs that share a common design genealogy, the execution history objects can be correlated automatically based on the identifier. The user can conduct comparative analyses of multiple process designs with a history correlation analysis using the execution history objects. Such correlations provide a persistent record of design evolutions and a knowledge transfer within one facility along a temporal axis, or between multiple facilities along a geographic axis. A typical analysis of such data is mapping execution history objects to constraints. These data maps for different versions are readily compared due to the Version Shared IDs.

Each of the system layers, including the General Design object 110, the General Master Design object 112, and the Master Design object 114 can be respectively operated to edit or manipulate the General Design 111, General Master Design 113, or Master Design 115, with changes on one layer tested against the other layers to determine if any changes violate any defined constraint. The different design construction modes of the systems include the following:

● Edit Mode: the user can add, modify, or edit entities. The user experience may be driven by parameter definitions and specific design level editing rules.

● Simulation Mode: the user initiates a simulation process that is executed by the system where mass balance, energy balance, and time-cycle data is refreshed for all valid entities. Invalid entities may be marked as such and validation results presented.

● Review Mode: the user explores and analyzes the current design results by using multiple interactive design views to decide on the next construction steps.

The edit mode may enforce the three level hierarchy (General Design, General Master, and Master) where only specific editing features are possible. The following are some examples: 1) General Design 111 Updates
   a. Modify or add a new Regulatory Constraint
   b. Modify or add a new General Operation 2) General Master Design 113 Updates
   a. Modify or add a new Quality Constraint
   b. Add General Master Generic Equipment Units, move existing General Master Operations, and add new General Master Operations
   c. Modify the equipment candidate list
   d. Rescale the design 3) Master Design 115 Updates
   a. Modify Phase Map selection and modify Phase parameters
   b. Modify an equipment selection
   c. Rescale the design within the constraints of the design and the equipment set When the user decides to make a change at a higher level in the design hierarchy, they may be required to create a new version of the design at that level and propagate the changes down to the next lower level (by creating newer versions of the lower design levels).

For example, a user may copy the design refinements implemented in a previous version of a General Master Design 113 and combine them with the design refinements of a newer General Design 111 version. The following are the high level steps of an exemplary algorithm: 1) If NOT (GMDesign.GDesign.VersionSharedID =TargetGDesign.VersionSharedID)
   a. GMDesign.Properties=TargetGDesign. Properties
   b. GMDesign.Option=GetNextOption(GMDesign.Option) p1 c. Delete GMDesign.GDesignOperationMaps 2) Else For Each GMDesign.Operation
   a. Find Mapped TargetGDesign Operation List
   b. Delete Maps to TargetGDesign Operations that do NOT exist
   c. If GDesign.Operation.VersionSharedID =TargetGDesign.Operation.VersionSharedID
      i. GDesign.Operation.Parameters =TargetGDesign.Operation.Parameters 3) Delete GMDesign.Reactions 4) GM Design. Reactions=DeriveReactions(TargetGDesign) 5) GM Design.Constraints=DeriveConstraints(TargetGDesign) 6) GMDesign.VersionSharedID=NewGUID 7) GMDesign.GDesignUID=TargetGDesign.UID 8) LatestGMDesignVersion=GetLatestGMDesignVersion(Facility, TargetGDesign) 9) GMDesign.Version=GetNextVersion(LatestGMDesignVersion)

Figure 12:
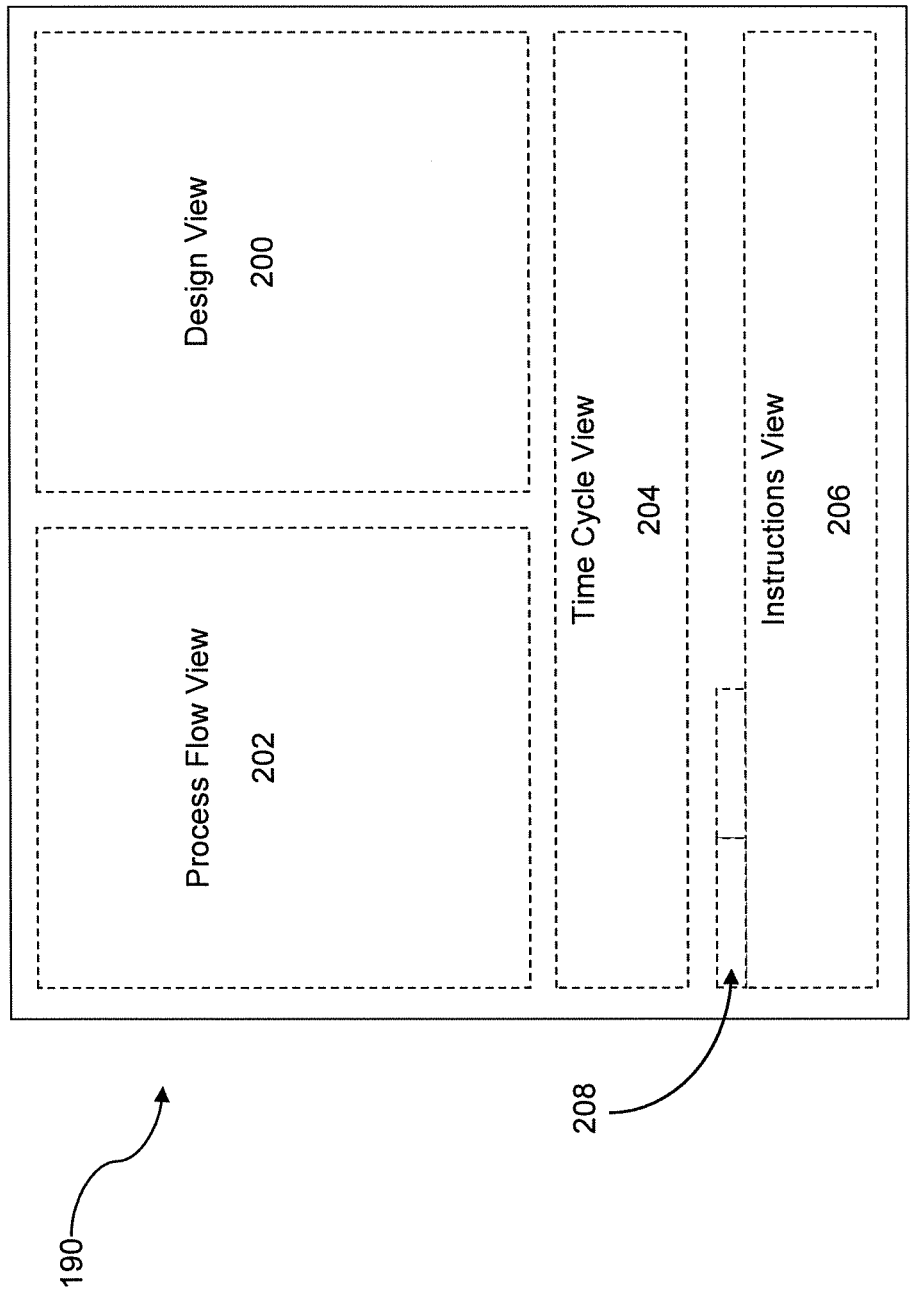
FIG. 12 is an illustration of a layout for a graphical user interface of a process design and management system in accordance with the present application.

The simulation mode may include the following high level algorithm: 1) Check Task graph for Cycle Errors 2) Check Task graph for Deadlocks Errors 3) Check Task graph for Branching Errors 4) Check Task graph for Generic Phase Mapping Errors 5) Validate Task graph
   a. Get Invalid Task List
   b. Setup Resources based on Resource Requirements
   c. Generate Task events for invalid Tasks in graph order 6) Run Simulation
   a. For Each Task Event
      i. Call Task Refresh Parameters Function (Dynamic Code)
      ii. Call Task Validate Function (Dynamic Code)
      iii. If Validate Error occurred
         1. Invalidate the Task and all downstream Tasks
      iv. Else
         1. Clear any outstanding Task resource acquires
         2. Get Task consolidated resource requirements via resource requests that are associated with capability requests
         3. Acquire Task resources
         4. Call Task Simulate Function (Dynamic Code)
         5. Release Task resources
         6. Perform Material Specification Transformations if any exist 7) If all Tasks simulated, collect Resource Usage Data 8) For Each Unit
   a. If Equipment selected, retrieve parameters from selected components
   b. Calculate unit volume utilization 9) Collect Material Transfer Records 10)Calculate Batch Size 11)Calculate Batch Yield 12)Calculate Time Cycle Data 13) For Each Task (in graph order), call Task Refresh Parameters Function (Dynamic Code) 14)For Each Constraint, call Constraint Validate Parameters Function (Dynamic Code) 15) Return Validation Results Referring now to FIG. 12, shown is an illustration of a layout for a graphical UI (User Interface) 190 of the Design System 102 of system 100. The UI may include a number of several visual components. Generally, the UI 190 may comprise a design view 200, a process flow view 202, time cycle view 204, and an instructions view 206, although not limited thereto. A design view 200 may provide a visual indicator of all of the operations laid out under the equipment units. The user may use the UI 190 to create operation entities and connections between operation port entities manually, and the design software may create generic phase entities and connect generic phase port entities as previously described.

Figure 13A:
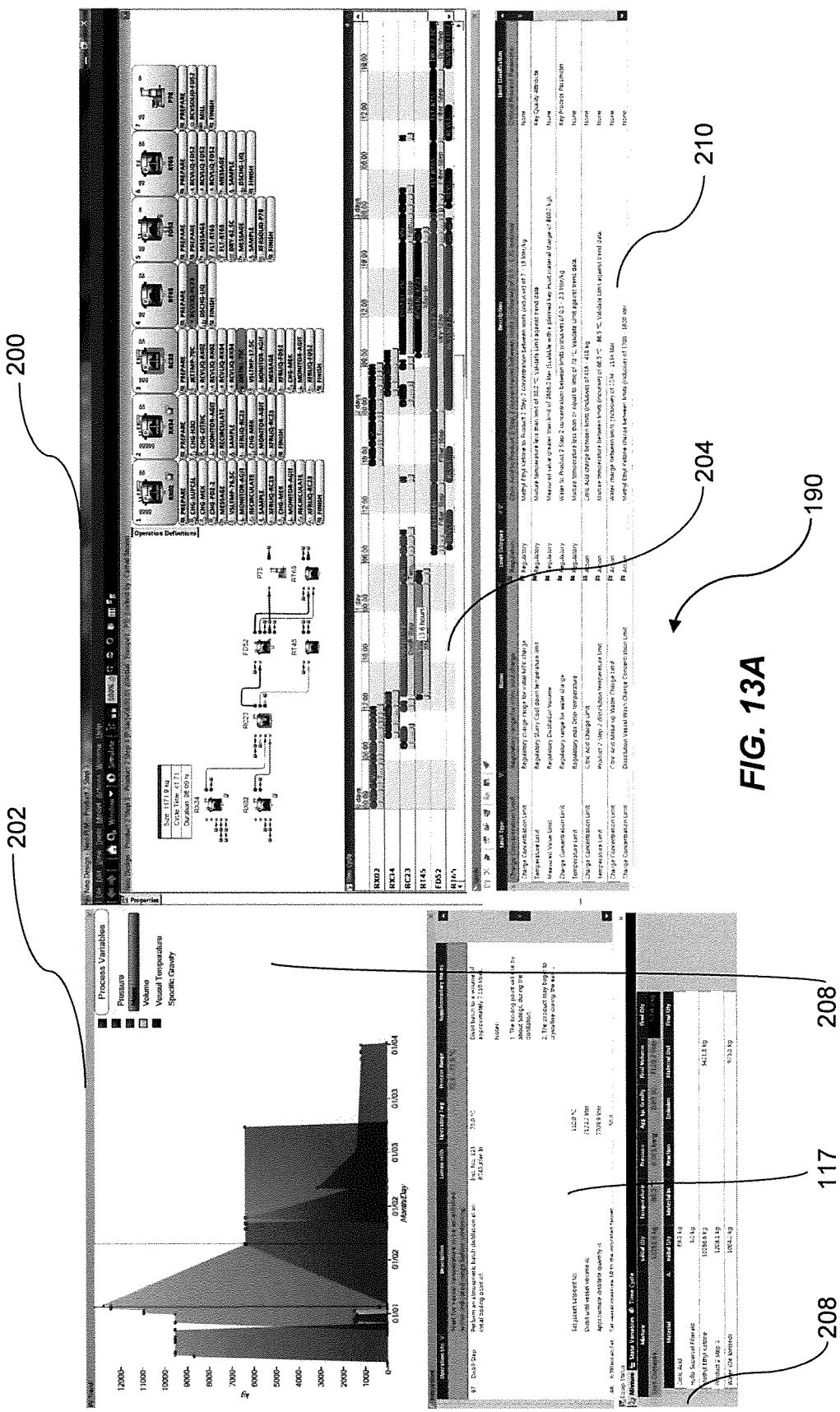
FIG. 13A is an example of a graphical user interface of a process design and management system in accordance with the present application, showing a process design layout, "Design" which includes units and operations, "Process Flow" which includes equipment and connections, "Time Cycle" (a Gantt chart of the manufacturing time cycle), and "Limits View" (constraints).
Figure 13B:
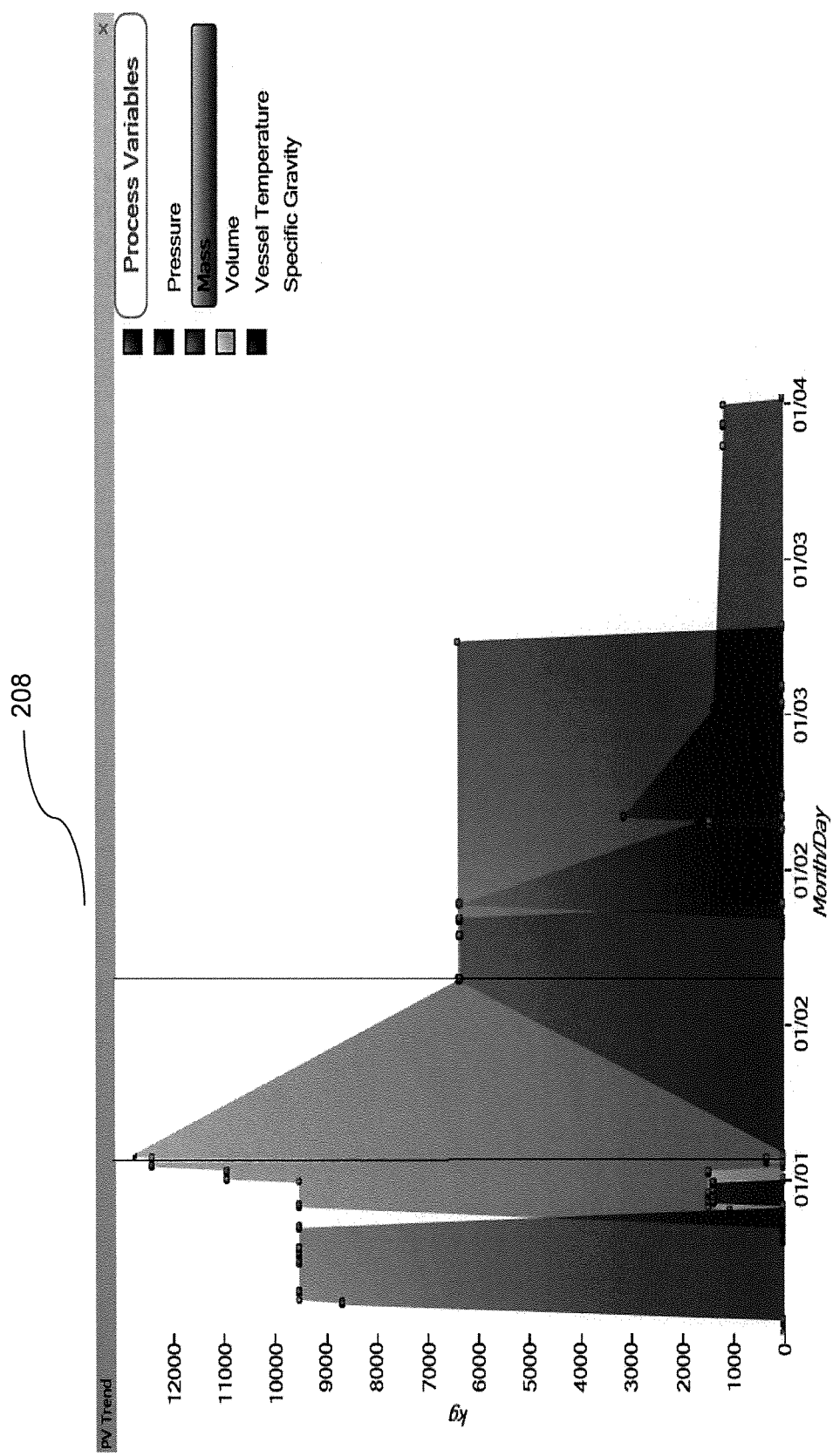
FIG. 13B is an example of a "PV Trend" (a process variable chart) in a graphical display window in the graphical user interface of FIG. 13A.
Figure 13C:
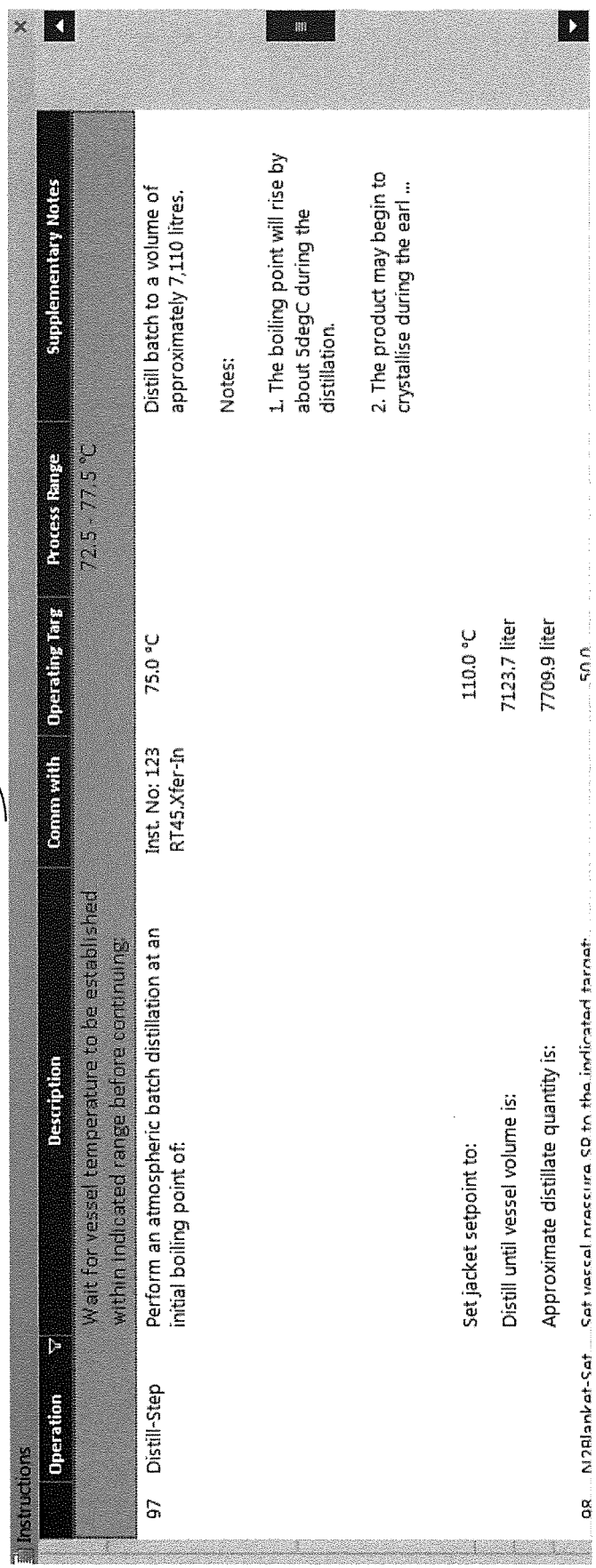
FIG. 13C is an example of "Instructions" (a Master Recipe instruction set) in a window in the graphical user interface of FIG. 13A.
Figure 13D:
FIG. 13D is an example of "Mixture" (a reagent mass balance chart) in a window in the graphical user interface of FIG. 13A.

Referring now to FIGS. 13A-D, shown are examples of the graphical user interface according to FIG. 12. The right side of FIG. 13A shows "Design" view 200 which includes units and operations, "Process Flow" view 202 which includes equipment and connections, "Time Cycle" view 204 (a Gantt chart of the manufacturing time cycle), and "Limits View" 210 (constraints). The left side of FIG. 13A shows subviews 208 including PV Trend, Instructions 206 (Master Recipe 117), and a unit state subview. FIG. 13B is a detail view of the PV Trend (a process variable chart) subview. FIG. 13C is a detail view of "Instructions" view 206 (a Master Recipe 117 instruction set). FIG. 13D is an example of a unit state subview (a reagent mass balance chart). Each window shows data pertaining to an exemplary 'Distill' operation. A system according to the present teachings may provide interactive GUI elements. Engineers can adjust design inputs and all elements are updated when the design is re-simulated. This way, changing some process information and re-simulating the design provides the user instant feedback on the impact of the change. The system automatically updates all associated internal and UI objects (e.g., Instruction View, Process Flow Diagram, Time Cycle View, Auxiliary Information Panels, etc.) to reveal the direct and indirect impact of design changes.

Figure 14:
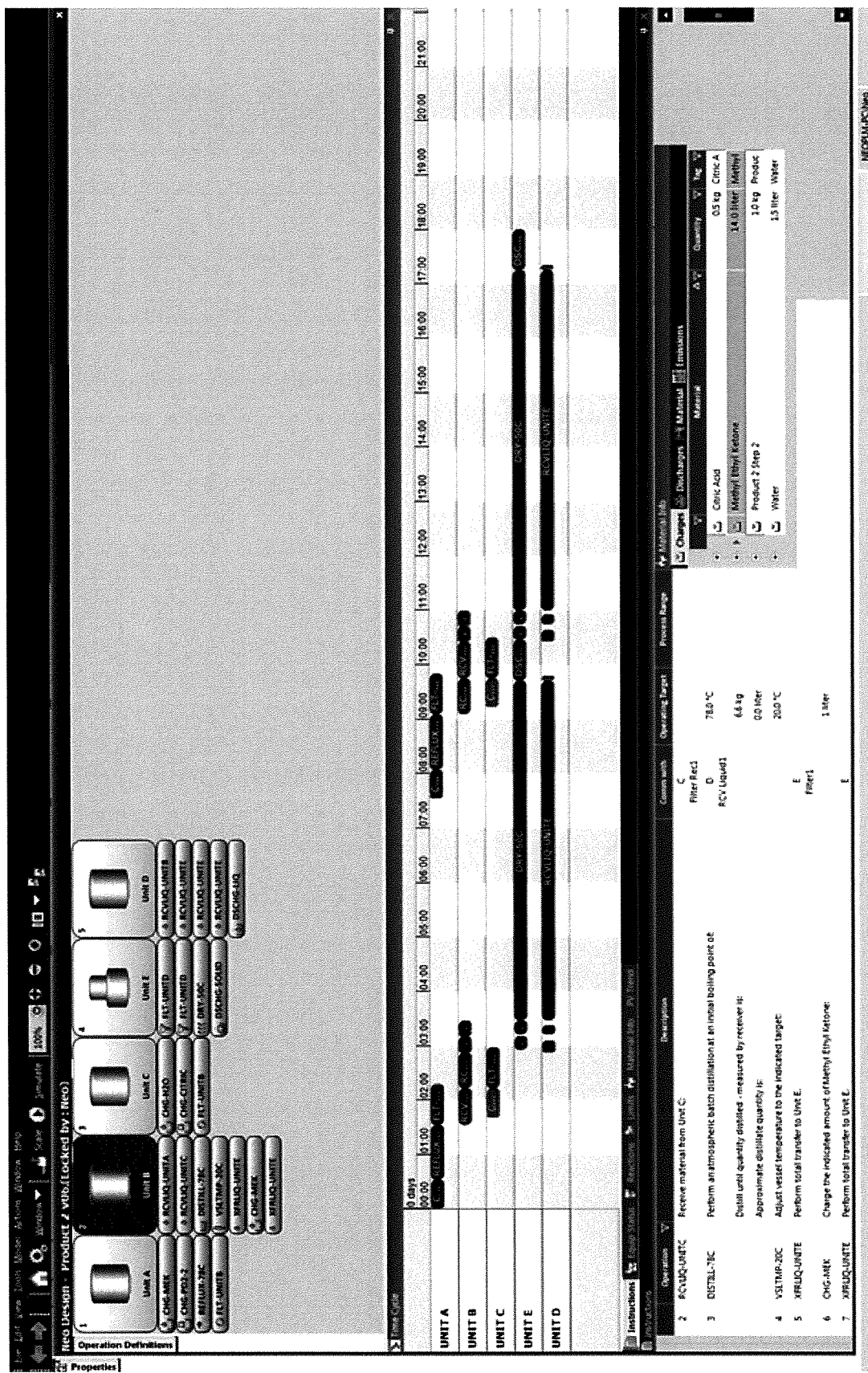
FIG. 14 is an example of a graphical user interface of a process design and management system in accordance with the present application, showing a process design layout, "Design" which includes units and operations, "Time Cycle" (a Gantt chart of the manufacturing time cycle), and "Instructions" (Master Recipe instruction set).
Figure 15:
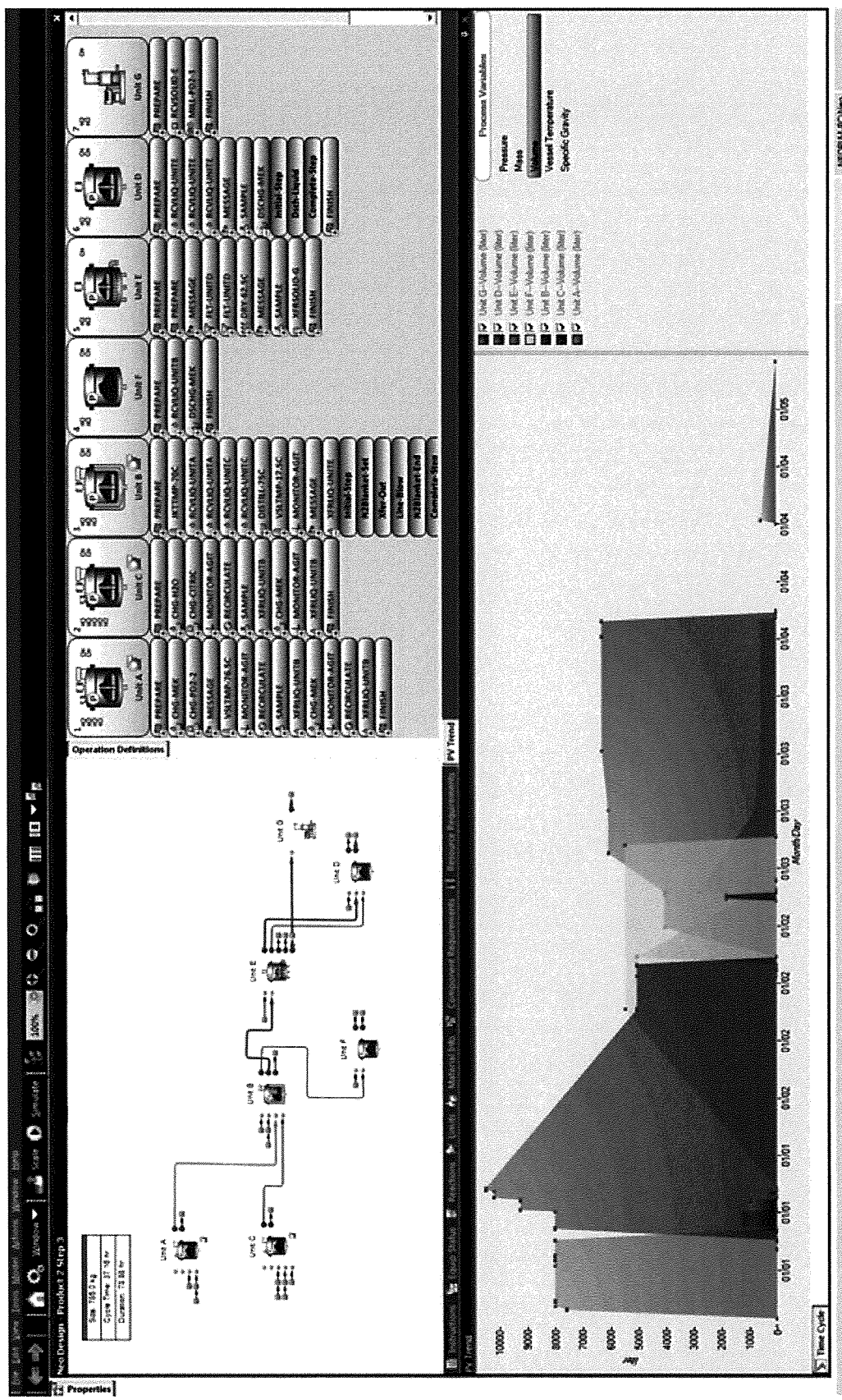
FIG. 15 is an example of a graphical user interface of a process design and management system in accordance with the present application, showing a process design layout, "Design" which includes units and operations, "Process Flow" which includes equipment and connections, and "PV Trend" (process variable chart).
Figure 16:
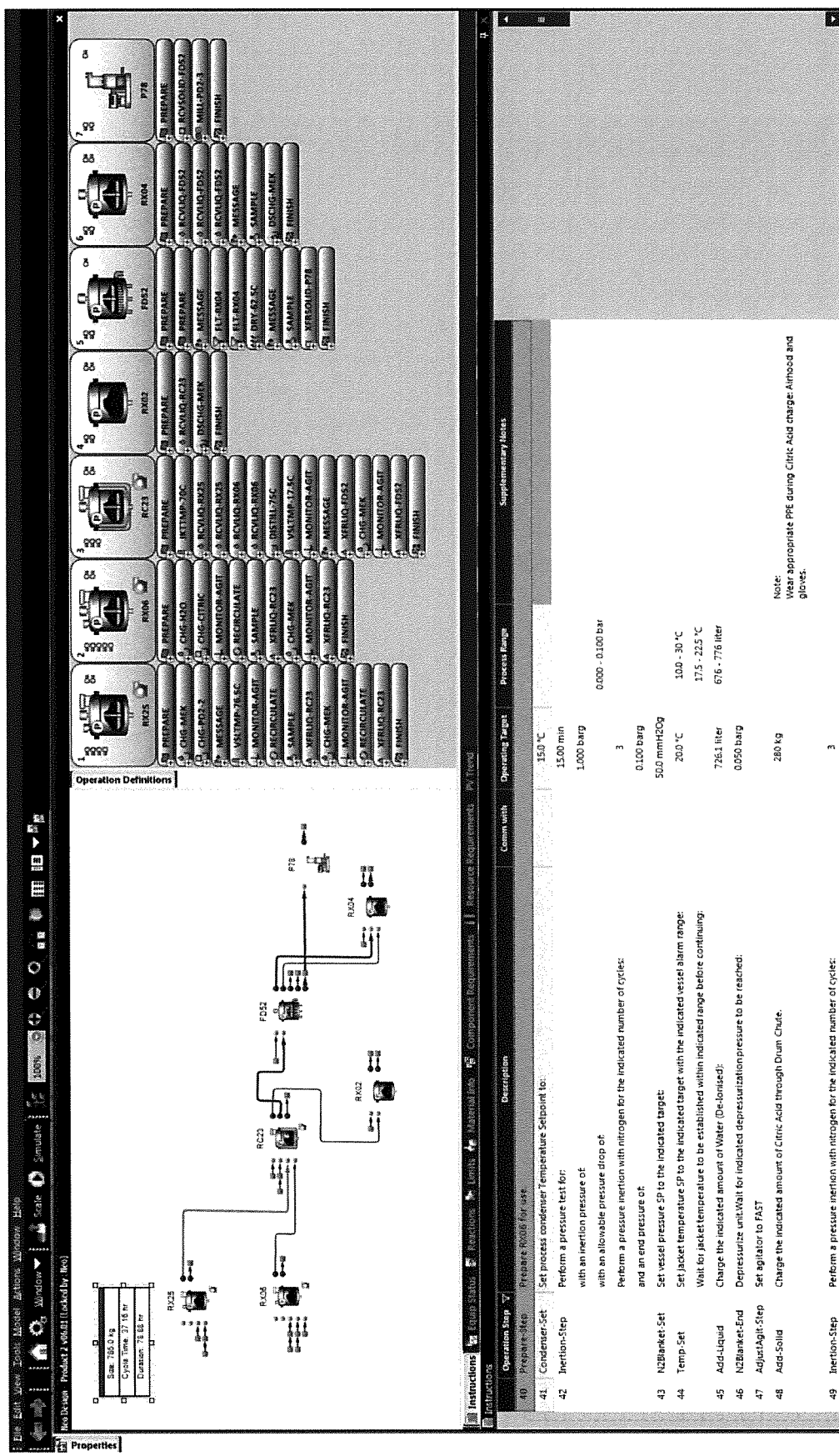
FIG. 16 is an example of a graphical user interface of a process design and management system in accordance with the present application, showing a process design layout, "Design" which includes units and operations, "Process Flow" which includes equipment and connections, and "Instructions" (Master Recipe instruction set).
Figure 17:
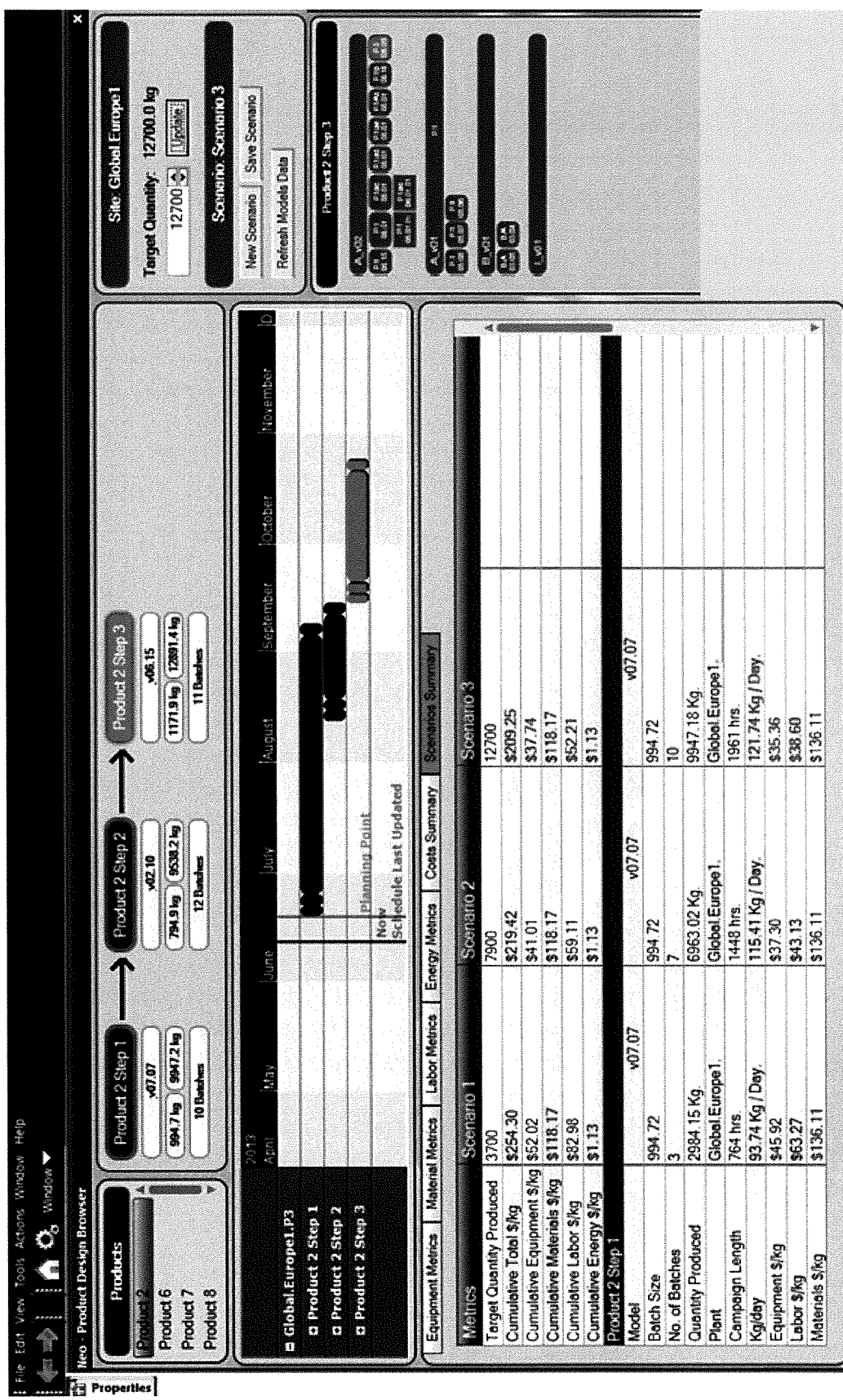
FIG. 17 is an example of a graphical user interface of a process design and management system in accordance with the present application, showing a "Product Browser" view, which includes a high level chart of process steps, a Gantt chart of the manufacturing time cycle, and Metrics analyzing product manufacturing cost for different batch sizes of product.

FIGS. 14-17 show embodiments of the graphical user interface 190 for designing and planning product manufacturing according to design system 102. FIG. 14 shows one embodiment of the user interface 190 for the General Design 110 layer of system 100. FIG. 15 shows one embodiment of the user interface 190 for the General Master Design 112 layer of system 100. As previously disclosed, the General Master Design 112 layer is derived from the General Design 110 layer and inherits all constraints and regulatory parameters. The General Master Design allows generic equipment-level detail. Process operations are further broken down to more discrete "generic phases" (or "actions"). FIG. 16 shows one embodiment of the user interface 190 for Master Design 114 layer of system 100. The Master Design 114 layer is derived from the General Master Design 112 layer inherits all constraints and regulatory parameters of both the General Master Design 112 layer and the and General Design 110 layer. FIG. 17 shows one embodiment of the user interface for product planning. A product planner may compile various reports from multiple designs to enable a cross-product view of useful metrics. The user can see the impact on the metrics as differing quantities of product are manufactured. Metrics include those related to cost, equipment utilization, productivity, and environmental, although not limited thereto. In this way, different production scenarios can be easily compared.

The design process may include the construction of a process flow diagram that allows the user to easily explore the equipment, inter-equipment connections, and material transfers. The process flow view 202 may provide for process flow processing. Tracking key material through the simulation may identify key equipment units. The process flow algorithm may have 3 phases:
- Phase 1: Key equipment is positioned in the center following key material processing flows from left to right.
- Phase 2: Feed equipment is positioned above the line and receiver equipment below the line.
- Phase 3: Connection routing is performed between equipment outlets and inlets to minimize line overlaps.

The above phases may include the following steps:
1) Phase 1
   a. Calculate a process flow index for all equipment based on key/product material flow
   b. Separate equipment into connected groups
   c. For each equipment group
      i. Use process flow index to calculate initial column positions of key equipment from left to right
      ii. Find cyclical equipment connections and break them
      iii. For each key equipment
         1. Find input equipment and output equipment and create key equipment group
         2. Recursively calculate column and row position for all input equipment that positions them above and to the left of the key equipment
         3. Recursively calculate column and row position for all output equipment that positions them below and to the right of the key equipment
      iv. Recalculate column and row positions for all equipment
   d. Recalculate column and row positions for all equipment groups
   e. Optimize empty space by compressing horizontally
2) Phase 2
   a. For each equipment from left to right
      i. Sort ports based on target/source type:
         1. key equipment;
         2. secondary equipment;
         3. equipment row;
         4. equipment column;
         5. none
      ii. Route connection lines between output ports and inlet ports using up to 3 stages:
         1. Horizontal right;
         2. Vertical down; and
         3. Horizontal right;
3) Phase 3
   a. Calculate absolute position of all objects based on object size and required spacing
   b. Draw connections A time cycle view 204 (seen in FIGS. 13A and 14 (middle panel)) for the process may be displayed in the form of a Gantt chart. This may be calculated to aid in the visualization of task timing information, the critical path, and task dependencies. The key data items are start time, end time, slack time, duration and connections for each design task.

An instruction view 206 (seen in FIGS. 13C and 16 (lower panel)) may provide recipe instructions and other subviews (tabbed auxiliary information panels or screens) 208, which may include tabular reports of various pieces of information. An instructions subview may display a description of each generic phase. Selecting a design task may display the instructions that are associated with it on this subview. If an instruction on the subview is selected, the design tasks that the text correlates to may be highlighted (or given some other designation).

A unit state subview (seen in FIG. 13D) may show an overall material balance and also a material balance on the individual materials. Also shown may be the expected temperature, volume and specific gravity. A state variables section may display parameter values associated with the selected design task, and a time cycle section may display time information, such as start time, end time and duration for the selected design task. A mixture section on a unit state subview may display the material balance. By clicking on a generic phase, the material balance at the end of the generic phase may be displayed.

A reactions subview may display all the reactions that take place within the design. When this subview is selected, the generic phase(s) where the reaction(s) are scheduled to take place may be highlighted (or given some other designation).

A limits subview (seen in FIG. 13A, lower panel) may display the constraints that are imposed upon the design. At the general design level, all constraints may be regulatory. In a General Master Design, however, there can be quality and process constraints which create tighter ranges. Clicking on a design task may show the constraints associated with that task and clicking on the background may show all constraints in the design.

A validation subview may be responsible for displaying simulation messages to the user regarding the current design. Each message may contain the message result as well as its type and a description of the error. The message result can be of several types such as, for example:
- Info—States information regarding the design to the user.
- Warning—Informative message that does not need to be resolved to complete the design.
- Error—Problem with the design that must be resolved prior to completing the design.

The message type can be of several different types such as, for example:
- Completeness—Indicates a problem in the design which must be resolved prior to marking the design complete.
- Limit—Indicates a problem related to one of the constraints defined in the design.
- Not Provided—Indicates that required information is not provided to the design.
- Operation—Indicates a problem related to one of the operations in the design.

- Generic Phase—Indicates a problem related to one of the generic phases in the design. (General Master Design)
- Generic Phase Mapping—Indicates an error or warning while mapping generic phases. (Master Design)
- Phase—Indicates a problem related to one of the phases in the design. (Master Design)
- Referential Integrity—Indicates a problem with the references from a child design to its parent design. An example of this would be a General Master operation which is not mapped to a parent general operation.
- Structural Integrity—Indicates a problem with the structure of the design. This may be related to the presence of a disconnected unit, a loop or a deadlock within the design.

A material summary subview may describe the charges and discharges associated with the design (e.g., General Master Design). The subview may display each material used in the design, as well as how much was charged/discharged. The user may expand a material usage record to reveal the individual charges by generic phase along with the percentage of the total design charge. By clicking on the material, the design tasks associated with that charge/discharge may be highlighted in other design views (or given some other designation). The material summary subview also may have sections regarding intra-unit transfers and emissions. The intra-unit transfers section may display information regarding the transfer of materials from one unit to another. The emissions section may display emissions output for each generic phase in the design.

Designs may change from time to time due to equipment changes and optimization opportunities. Execution history that is correlated to different process designs that share a common design genealogy can be correlated by using methods such as, for example:
- Using global operations Version IDs ("VIDs"). VIDs may be maintained when a process design is copied or versioned.
- Using global operation group IDs (collection of sequential operations that represent a general process stage)

The user can optionally select operations from multiple designs manually to initiate a history correlation analysis.

Designs may be transferred between manufacturing plants using a system according to the present teachings. Design objects may be removed from General Master Designs that will be copied to other facilities such as, for example:
- Phase maps and phase objects
- Resource selections
- Equipment selections
- Facility specific resource injections
- Facility specific equipment capability specializations Target facility equipment specialization and resource injection rules may be processed before the design is saved. If the target facility does not have equipment that is compatible with the General Master Design, the user can perform the optional changes to transform the design such as, for example:
- Modify unit equipment classes (this action may generate validation errors that must be resolved by modifying operations or using different operations)
- Modify operation parameters
- Move operations to different units or new units If the target facility is in a different enterprise, then the user can optionally create the foreign source facility and save the design without modification.

To accommodate error free transfer of execution recipe information to a variety of execution systems (such as Paper Batch Books, Electronic Lab Notebooks, Distributed Control Systems, Manufacturing Execution Systems, etc.), facility specific phase definitions, phase maps, and recipe generators may be configured.

Design transfer between facilities within the same enterprise is relevant to General Master Designs and may be accomplished using the following algorithm: 1) If the design contains selected equipment remove all equipment 2) Remove all capability requirements and resource requirements 3) Execute capability specialization rules from the target facility 4) Execute capability request consolidation rules to create capability requirements 5) Execute resource injection rules from the target facility 6) Execute resource request consolidation rules to create resource requirements 7) Save the a new version of the General Master Design in the target facility Design transfer between enterprises may be accomplished by exporting a design package that contains the design, all associated reference data, and all associated library data. The receiving enterprise imports the package. The package import algorithm may perform the following actions, although not limited thereto: 1) If the target site facility does not exist, create a site database 2) If the target plant facility does not exist, create it inside the target site database 3) If the target equipment does not exist in the target facilities, create it in the target facilities 4) If the target materials, reactions, and product steps do not exist in the global facility, create them 5) Create the target design Using the system, users may easily scale design models. Scaling refers to the changing of the quantity of material that is used or produced by a design. Typically, the quantity of material consumed by a General Master Design will be different from the quantity consumed by a General Design because plant engineers will be exploring optimum batch size/time cycle combinations. Therefore, the ability to scale designs upward or downward is desirable. If a user wants to scale a design, they may click a scale button.

The system may allow the scaling of designs in a number of ways such as, for example:
- Scale to a specified scale factor—This may scale the design according to the value input by the user (e.g., a factor of 10 would multiply scalable mass values in the design by 10).
- Scaling to target batch size—When scaling to a target batch size (mass), the scaling ratio may be determined by identifying the ratio between the original batch size (mass) and the target batch size (mass). All "Charge" operations within the design may then be scaled using this ratio—with the exception of non-scalable materials.
- Scaling to maximum batch size—The design may be scaled according to the maximum batch size.
- Scaling to target unit volume—This may calculate the scaling ratio by dividing the target unit volume by the maximum mixture volume of the selected unit. This scaling ratio may then be applied across the design. Volume scaling may be assumed to be linear; the effects of pressure and temperature may be ignored for the purpose of volume scaling.

When scaling a design, non-scalable mass values may be left unchanged. Examples are fixed wash or rinse charge quantities. The system can handle the full range of scalability, from lab scale to full-scale production volumes. As such, calculations may not entail rounding, except for the purpose of display. Scaling has an impact on unit states and time cycles within simulation streams and therefore, the system may invalidate the entire design after user initiated scaling. The user may perform a design re-simulation to revalidate the design after scaling.

While the present teachings have been described above in terms of specific embodiments, it is to be understood that they are not limited to these disclosed embodiments. Many modifications and other embodiments will come to mind to those skilled in the art to which this pertains, and which are intended to be and are covered by this disclosure. It is intended that the scope of the present teachings should be determined by proper interpretation and construction of this disclosure and its legal equivalents, as understood by those of skill in the art relying upon this specification and the attached drawings.

What is claimed is:

1. A method of chemical, biological, or pharmaceutical process design and management executed on a computer having a storage on which a process library is saved, the process library including material data, process data, and equipment data, the method utilizing computer readable instructions performing the steps of:
   receiving a General Design defining operations sequences, and processing operation parameters including materials balances, cycle time and constraints for manufacturing a chemical, biological, or pharmaceutical product based on user input data and retrieved process library data;
   executing a General Master Design defining operations equipment sequences, and processing operation parameters including equipment, generic equipment capability requirements, materials balances, cycle time and constraints for manufacturing a chemical, biological, or pharmaceutical product; and
   executing a Master Design defining operations equipment sequences, and processing operation parameters including specific equipment, specific equipment capability requirements, actual capacity analysis, materials flows and balances, cycle time and constraints for manufacturing a chemical, biological, or pharmaceutical product.

2. The method of claim 1, wherein the step of executing a General Master Design further comprises: defining generic phases of the equipment process.

3. The method of claim 2, wherein the step of executing a Master Design further comprises: mapping generic phases to specific phases for specific execution systems in a specific manufacturing facility.

4. The method of claim 1, further comprising the step of creating a Master Recipe.

5. The method of claim 4, further comprising the step of:
   controlling a chemical, biological or pharmaceutical manufacturing process in accordance with the Master Recipe through one or more of a manufacturing plant distributed control system, laboratory information management system, manufacturing execution system ("MES").

6. The method of claim 5, further comprising the steps of: measuring process parameters;
   storing process parameter measurement data in a process data archive; and
   correlating process parameter measurement data to the Master Design to determine variances or anomalies.

7. The method of claim 1, further comprising the step of transferring a process design from a first manufacturing facility to a second manufacturing facility.

8. The method of claim 7, wherein the step of transferring the process design comprises the steps of:
   storing a generic equipment process derived by the General Master Design in the storage;
   retrieving the stored generic equipment process from the storage;
   executing the Master Design to derive a new plant-specific equipment process correlated to the second manufacturing facility.

9. The method of claim 1, wherein the General Design, the General Master Design and the Master Design are stored on the storage.

10. The method of claim 1, wherein the computer is selected from the group consisting of: a digital signal processor, a field-programmable gate array, an application-specific integrated circuit, a micro-processor, a micro-controller, or any other form of programmable hardware.

11. The method of claim 1, further comprising the step of generating a manufacturing process design based on user input data and retrieved process library data using a graphical user interface for the computer.

12. The method of claim 11, wherein the graphical user interface allows multiple views of the manufacturing process design.

13. The method of claim 12, wherein the views include one or more of: a design view, a process flow view, a time cycle view, and an instructions view.

14. The method of claim 13, wherein the views are defined by one or more of the following:
   the design view identifies each equipment unit and lists chemical, biological or pharmaceutical process operations with each equipment unit;
   the process flow view displays inter-equipment connections and material transfers for the process;
   the time cycle view displays start time, end time, slack time and duration for each operation of the process in order; and
   the instructions view displays manufacturing instructions which list all required inputs and steps of the chemical, biological or pharmaceutical process.

15. The method of claim 13, wherein the design view, process flow view, and time cycle view dynamically interact with each other such that a change in one view will result in a corresponding change in the others.

16. The method of claim 1, further comprising the step of validating the process design by executing a process simulation.

17. The method of claim 1, further comprising the step of:
   assigning globally unique identifiers to each process ingredient and process step;
   wherein data relating to the ingredients and the process steps is stored enabling a correlated execution history.

18. A method of chemical, biological, or pharmaceutical process design and management executed on a computer having a storage on which a process library is saved, the process library including material data, process data, and equipment data, the method utilizing computer readable instructions performing the steps of:
   executing a General Master Design defining operations equipment sequences, and processing operation parameters including equipment, generic equipment capability requirements, materials balances, cycle time and constraints for manufacturing a chemical, biological, or pharmaceutical product based on user input data and retrieved process library data; and
   executing a Master Design defining operations equipment sequences, and processing operation parameters including specific equipment, specific equipment capability requirements, actual capacity analysis, materials flows and balances, cycle time and constraints for manufacturing a chemical, biological, or pharmaceutical product.

19. The method of claim 18, wherein the step of executing a General Master Design further comprises: defining generic phases of the equipment process.

20. The method of claim 19, wherein the step of executing a Master Design further comprises: mapping generic phases to specific phases for specific execution systems in a specific manufacturing facility.

21. The method of claim 18, further comprising the step of creating a Master Recipe.

22. The method of claim 21, further comprising the step of:
controlling a chemical, biological or pharmaceutical manufacturing process in accordance with the Master Recipe through one or more of a manufacturing plant distributed control system, laboratory information management system, manufacturing execution system ("MES").

23. The method of claim 22, further comprising the steps of:
measuring process parameters;
storing process parameter measurement data in a process data archive; and
correlating process parameter measurement data to the Master Design to determine variances or anomalies.

24. The method of claim 18, further comprising the step of generating a manufacturing process design based on user input data and retrieved process library data using a graphical user interface for the computer.

25. The method of claim 24, wherein the graphical user interface allows multiple views including one or more of: a design view, a process flow view, a time cycle view, and an instructions view.

26. The method of claim 25, wherein the views are defined by one or more of the following:
the design view identifies each equipment unit and lists chemical, biological or pharmaceutical process operations with each equipment unit;
the process flow view displays inter-equipment connections and material transfers for the process;
the time cycle view displays start time, end time, slack time and duration for each operation of the process in order; and
the instructions view displays manufacturing instructions which list all required inputs and steps of the chemical, biological or pharmaceutical process.

27. A method of chemical, biological, or pharmaceutical process design and management executed on a computer having a storage on which a process library is saved, the process library including material data, process data, and equipment data, the method utilizing computer readable instructions performing the steps of:
receiving a General Master Design defining operations equipment sequences, and processing operation parameters including equipment, generic equipment capability requirements, materials balances, cycle time and constraints for manufacturing a chemical, biological, or pharmaceutical product based on user input data and retrieved process library data; and
executing a Master Design defining operations equipment sequences, and processing operation parameters including specific equipment, specific equipment capability requirements, actual capacity analysis, materials flows and balances, cycle time and constraints for manufacturing a chemical, biological, or pharmaceutical product.

28. The method of claim 27, wherein the step of executing a Master Design further comprises: mapping generic phases to specific phases for specific execution systems in a specific manufacturing facility.

29. The method of claim 27, further comprising the step of creating a Master Recipe.

30. The method of claim 29, further comprising the step of:
controlling a chemical, biological or pharmaceutical manufacturing process in accordance with the Master Recipe through one or more of a manufacturing plant distributed control system, laboratory information management system, manufacturing execution system ("MES").

31. The method of claim 30, further comprising the steps of:
measuring process parameters;
storing process parameter measurement data in a process data archive; and
correlating process parameter measurement data to the Master Design to determine variances or anomalies.

* * * * *